(12) United States Patent
Debique et al.

(10) Patent No.: US 7,613,767 B2
(45) Date of Patent: Nov. 3, 2009

(54) RESOLVING A DISTRIBUTED TOPOLOGY TO STREAM DATA

(75) Inventors: Kirt A. Debique, Seattle, WA (US); Thomas A. Thornton, Bellevue, WA (US); Troy D. Batterberry, Kirkland, WA (US); Nadim Y. Abdo, Redmond, WA (US); Alexandre V. Grigorovitch, Redmond, WA (US); Dale A. Sather, Seattle, WA (US); Roland Y. Ayala, Woodinville, WA (US); Eduardo P. Oliveira, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1226 days.

(21) Appl. No.: 10/618,335

(22) Filed: Jul. 11, 2003

(65) Prior Publication Data

US 2005/0021590 A1 Jan. 27, 2005

(51) Int. Cl.
*G06F 15/16* (2006.01)
(52) U.S. Cl. .................. 709/203; 709/220; 709/221; 709/222; 709/231; 715/734
(58) Field of Classification Search ................ 709/203, 709/220–222, 228, 231; 715/734
See application file for complete search history.

(56) References Cited

U.S. PATENT DOCUMENTS

| | | |
|---|---|---|
| 5,140,437 A | 8/1992 | Yonemitsu et al. |
| 5,420,801 A | 5/1995 | Dockter et al. |
| 5,528,281 A | 6/1996 | Grady et al. |
| 5,539,886 A | 7/1996 | Aldred et al. |
| 5,546,584 A | 8/1996 | Lundin et al. |
| 5,574,934 A | 11/1996 | Mirashrafi et al. |
| 5,577,258 A | 11/1996 | Cruz et al. |
| 5,604,843 A | 2/1997 | Shaw et al. |
| 5,625,404 A | 4/1997 | Grady et al. |
| 5,675,752 A | 10/1997 | Scott et al. |
| 5,712,906 A | 1/1998 | Grady et al. |
| 5,764,965 A | 6/1998 | Poimboeuf et al. |
| 5,765,011 A | 6/1998 | Wilkinson et al. |
| 5,786,814 A | 7/1998 | Moran et al. |
| 5,802,283 A | 9/1998 | Grady et al. |
| 5,815,689 A | 9/1998 | Shaw et al. |

(Continued)

FOREIGN PATENT DOCUMENTS

EP 0784271 A2 7/1997

(Continued)

OTHER PUBLICATIONS

Timothy K. Shih, "Participator Dependent Multimedia Presentation", Journal of Information Sciences, vol. 107, pp. 85-105, 1998.

(Continued)

*Primary Examiner*—Alina N. Boutah
(74) *Attorney, Agent, or Firm*—Lee & Hayes, PLLC

(57) ABSTRACT

A distributed media session is described, which when executed, resolves a distributed topology from a request to stream data from a source device to a client device over a network. The distributed topology references a plurality of software components that, when executed, fulfill the request. At least one of the plurality of software components is executable on each of the source device and the client device.

44 Claims, 21 Drawing Sheets

U.S. PATENT DOCUMENTS

| | | | |
|---|---|---|---|
| 5,878,431 | A | 3/1999 | Potterveld et al. |
| 5,886,274 | A | 3/1999 | Jungleib |
| 5,887,139 | A | 3/1999 | Madison, Jr. et al. |
| 5,892,767 | A * | 4/1999 | Bell et al. ............... 370/432 |
| 5,936,643 | A | 8/1999 | Tindell et al. |
| 5,987,628 | A | 11/1999 | Von Bokern et al. |
| 5,995,512 | A | 11/1999 | Pogue, Jr. |
| 5,996,015 | A * | 11/1999 | Day et al. ............... 709/226 |
| 6,014,706 | A | 1/2000 | Cannon et al. |
| 6,038,625 | A | 3/2000 | Ogino et al. |
| 6,044,408 | A * | 3/2000 | Engstrom et al. .......... 719/328 |
| 6,178,172 | B1 | 1/2001 | Rochberger |
| 6,185,612 | B1 | 2/2001 | Jensen et al. |
| 6,192,354 | B1 | 2/2001 | Bigus et al. |
| 6,209,041 | B1 | 3/2001 | Shaw et al. |
| 6,243,753 | B1 | 6/2001 | Machin et al. |
| 6,262,776 | B1 | 7/2001 | Griffits |
| 6,263,486 | B1 | 7/2001 | Boezeman et al. |
| 6,266,053 | B1 | 7/2001 | French et al. |
| 6,279,029 | B1 | 8/2001 | Sampat et al. |
| 6,308,216 | B1 | 10/2001 | Goldszmidt et al. |
| 6,317,131 | B2 | 11/2001 | Basso et al. |
| 6,321,252 | B1 | 11/2001 | Bhola et al. |
| 6,343,313 | B1 * | 1/2002 | Salesky et al. ............ 709/204 |
| 6,347,079 | B1 | 2/2002 | Stephens et al. |
| 6,369,835 | B1 | 4/2002 | Lin |
| 6,385,201 | B1 | 5/2002 | Iwata |
| 6,389,467 | B1 | 5/2002 | Eyal |
| 6,430,526 | B1 | 8/2002 | Toll |
| 6,466,971 | B1 * | 10/2002 | Humpleman et al. ....... 709/220 |
| 6,536,043 | B1 | 3/2003 | Guedalia |
| 6,539,163 | B1 | 3/2003 | Sheasby et al. |
| 6,546,426 | B1 | 4/2003 | Post |
| 6,549,932 | B1 | 4/2003 | McNally et al. |
| 6,581,102 | B1 | 6/2003 | Amini et al. |
| 6,594,699 | B1 * | 7/2003 | Sahai et al. ............... 709/228 |
| 6,594,773 | B1 | 7/2003 | Lisitsa et al. |
| 6,618,752 | B1 * | 9/2003 | Moore et al. ............. 709/217 |
| 6,625,643 | B1 * | 9/2003 | Colby et al. .............. 709/217 |
| 6,658,477 | B1 | 12/2003 | Lisitsa et al. |
| 6,684,331 | B1 * | 1/2004 | Srivastava ................ 713/163 |
| 6,691,312 | B1 | 2/2004 | Sen et al. |
| 6,694,368 | B1 | 2/2004 | An et al. |
| 6,711,171 | B1 | 3/2004 | Dobbins et al. |
| 6,725,274 | B1 | 4/2004 | Slik |
| 6,725,279 | B1 | 4/2004 | Richter et al. |
| 6,757,735 | B2 * | 6/2004 | Apostolopulos et al. .... 709/231 |
| 6,802,019 | B1 | 10/2004 | Lauder |
| 6,810,526 | B1 | 10/2004 | Menard et al. |
| 6,823,225 | B1 | 11/2004 | Sass |
| 6,920,181 | B1 | 7/2005 | Porter |
| 6,957,430 | B2 | 10/2005 | Fant et al. |
| 6,975,752 | B2 | 12/2005 | Dixon et al. |
| 7,024,483 | B2 | 4/2006 | Dinker et al. |
| 7,035,858 | B2 | 4/2006 | Dinker et al. |
| 7,047,554 | B1 | 5/2006 | Lortz |
| 7,076,564 | B2 * | 7/2006 | To et al. .................. 709/238 |
| 7,124,424 | B2 | 10/2006 | Gordon et al. |
| 7,139,925 | B2 | 11/2006 | Dinker et al. |
| 7,197,535 | B2 * | 3/2007 | Salesky et al. ............ 709/204 |
| 7,206,854 | B2 | 4/2007 | Kauffman et al. |
| 7,240,325 | B2 * | 7/2007 | Keller ..................... 717/104 |
| 7,246,318 | B2 * | 7/2007 | Debique et al. ........... 715/734 |
| 7,290,057 | B2 | 10/2007 | Saunders et al. |
| 7,299,485 | B2 | 11/2007 | Chaney et al. |
| 7,330,542 | B2 * | 2/2008 | Kauhanen et al. .......... 379/229 |
| 7,415,537 | B1 * | 8/2008 | Maes ...................... 709/246 |
| 7,426,637 | B2 * | 9/2008 | Risan et al. ............... 713/165 |
| 2001/0000962 | A1 | 5/2001 | Rajan |
| 2001/0024455 | A1 * | 9/2001 | Thaler et al. ............. 370/503 |
| 2002/0051017 | A1 | 5/2002 | Wishoff |
| 2002/0085581 | A1 * | 7/2002 | Hauck et al. .............. 370/442 |
| 2002/0099842 | A1 | 7/2002 | Jennings et al. |
| 2002/0123997 | A1 * | 9/2002 | Loy et al. ..................... 707/8 |
| 2002/0158897 | A1 | 10/2002 | Besaw et al. |
| 2002/0199031 | A1 | 12/2002 | Rust et al. |
| 2003/0028643 | A1 * | 2/2003 | Jabri ....................... 709/226 |
| 2003/0033424 | A1 * | 2/2003 | Gould ..................... 709/233 |
| 2003/0056029 | A1 | 3/2003 | Huang et al. |
| 2003/0093568 | A1 | 5/2003 | Deshpande |
| 2003/0095504 | A1 | 5/2003 | Ogier |
| 2003/0101253 | A1 | 5/2003 | Saito et al. |
| 2003/0123659 | A1 * | 7/2003 | Forstrom et al. ........... 380/205 |
| 2003/0146915 | A1 | 8/2003 | Brook et al. |
| 2003/0149772 | A1 * | 8/2003 | Hsu et al. ................. 709/227 |
| 2003/0158957 | A1 | 8/2003 | Abdolsalehi |
| 2003/0177292 | A1 | 9/2003 | Smirnov et al. |
| 2003/0215214 | A1 | 11/2003 | Ma |
| 2003/0231867 | A1 * | 12/2003 | Gates et al. ................. 386/69 |
| 2003/0236892 | A1 * | 12/2003 | Coulombe ................ 709/228 |
| 2003/0236906 | A1 * | 12/2003 | Klemets et al. ............ 709/231 |
| 2004/0001106 | A1 | 1/2004 | Deutscher et al. |
| 2004/0004631 | A1 * | 1/2004 | Debique et al. ........... 345/704 |
| 2004/0031058 | A1 | 2/2004 | Reisman |
| 2004/0042413 | A1 * | 3/2004 | Kawamura et al. ......... 370/252 |
| 2004/0073596 | A1 * | 4/2004 | Kloninger et al. .......... 709/200 |
| 2004/0073912 | A1 * | 4/2004 | Meza ...................... 719/321 |
| 2004/0080504 | A1 * | 4/2004 | Salesky et al. ............ 345/418 |
| 2004/0139157 | A1 | 7/2004 | Neely, III et al. |
| 2004/0177162 | A1 | 9/2004 | Wetzel et al. |
| 2004/0207723 | A1 | 10/2004 | Davis et al. |
| 2004/0208132 | A1 | 10/2004 | Neulist et al. |
| 2004/0220926 | A1 | 11/2004 | Lamkin et al. |
| 2004/0236945 | A1 * | 11/2004 | Risan et al. ............... 713/165 |
| 2004/0267778 | A1 * | 12/2004 | Rudolph et al. ........... 707/100 |
| 2004/0267899 | A1 | 12/2004 | Rahman et al. |
| 2004/0267953 | A1 | 12/2004 | Dunbar et al. |
| 2004/0268224 | A1 | 12/2004 | Balkus et al. |
| 2004/0268357 | A1 * | 12/2004 | Joy et al. .................. 718/105 |
| 2004/0268407 | A1 * | 12/2004 | Sparrell et al. ............. 725/116 |
| 2005/0005025 | A1 * | 1/2005 | Harville et al. ............ 709/241 |
| 2005/0018775 | A1 | 1/2005 | Subramanian et al. |
| 2005/0055517 | A1 | 3/2005 | Olds et al. |
| 2005/0066082 | A1 | 3/2005 | Forin et al. |
| 2005/0081158 | A1 | 4/2005 | Hwang |
| 2005/0125734 | A1 | 6/2005 | Mohammed et al. |
| 2005/0132168 | A1 | 6/2005 | Weiss et al. |
| 2005/0172309 | A1 | 8/2005 | Risan et al. |
| 2005/0188311 | A1 | 8/2005 | Diesel et al. |
| 2005/0198189 | A1 * | 9/2005 | Robinson et al. ........... 709/217 |
| 2005/0204289 | A1 | 9/2005 | Mohammed et al. |
| 2005/0226324 | A1 | 10/2005 | Ouyang et al. |
| 2005/0262254 | A1 | 11/2005 | Sherwani |
| 2007/0011321 | A1 | 1/2007 | Huntington et al. |
| 2008/0037957 | A1 | 2/2008 | Nallur et al. |
| 2008/0154407 | A1 | 6/2008 | Carson |

FOREIGN PATENT DOCUMENTS

| | | | |
|---|---|---|---|
| EP | 0814403 | A1 | 12/1997 |
| JP | 2002514797 | | 5/2002 |
| WO | WO9621189 | A1 | 7/1996 |
| WO | WO9957837 | A2 | 11/1999 |

OTHER PUBLICATIONS

Timothy K. Shih and Wen C. Pai, "A Stepwise Refinement Approach to Multimedia Presentation Designs", IEEE, pp. 117-122, 1997.

Arbab Ali Samejo et al., "Graphical User Interface Based Multimedia Web Suite in Windows Evironment", Mehran Unversity Research Journal of Engineering & Technology, vol. 20, No. 2, pp. 57-68, Apr. 2001.

Timothy Shih, et al., "A Knowledge Abstraction Approach for Multimedia Presentation", IEEE, pp. 528-532, 1997.

Sei-Hoon Lee and Chang-Jong Wang, "Open Multimedia/Hypermedia Application Development Environment", Inspec, 1996.

Chi-Ming Chung, et al., "A Control and Data Abstraction Approach for Multimedia Presentation", Journal of the Chinese Institute of Electrical Engineering, vol. 5, No. 3, pp. 265-276, 1998.

Robertson, Mark A.; Stevenson, Robert L.; "Temporal Resolution Enhancement in Compressed Video Sequences"; University of Notre Dame, Notre Dame, Indiana; Sep. 2001; pp. 1-11.

Girod, Bernd; Farber, Niko; "Feedback-Based Error control for Mobile Video Transmission"; Proceedings of the IEEE, v87, n10, Oct. 1999; pp. 1707-1723.

Chien, Shao-Yi; Chen, Ching-Yeh; Huang, Yu-Wen; and Chen, Liang-Gee; "Multiple Sprites and Frame Skipping Techniques for Sprite Generation with High Subjuctive Quality and Fast Speed"; IEEE 2002; pp. 785-788.

Olson, Robert, et al., "Remote Rendering Using Vtk and Vic," website at http://www-unix.mcs.anl.gov/fl/publications/vis00-vicvtk.pdf, 2 pages.

Engel, Klaus et al, "Remote 3D Visualization Using Image-Streaming Techniques" website at: http://citeseer.nj.nec.com/394248.html, 4 pages.

Engel, K., et al., "Combining Local and Remote Visualization Techniques for Interactive Volume Rendering in Medical Applications" website at http://wwwvis.informatik.uni-stuttgart.de/eng/research/pub/pub2000/engel_vis00.pdf.

TGS website at http://www.tgs.com/pro_div/oiv_overview.htm, Open Inventor from TGS4.0 "Open Inventor Overview," printed Apr. 28, 2003, 4 pages.

Dunn, et al., "The Design and Implementation of JaDiSM", Nov. 13, 2007, pp. 38.

Chatterjee, et al., "Microsoft DirectShow: A New Media Architecture", SMPTE Journal, 1997, pp. 865-871.

Cline, et al., "DirectShow RTP Support for Adaptivity in Networked Multimedia Applications", IEEE, 1998, pp. 13-22.

Agarwal, et al., "The Totem Multiple-Ring Ordering and Topology Maintenance Protocol", ACM, vol. 16, No. 2, 1998, pp. 93-132.

Bao, et al., "Topology Management in Ad Hoc Networks", ACM, 2003, pp. 129-140.

Jaffe, et al., "Automatic Update of Replicated Topology Data Base", ACM, 1984, pp. 142-148.

Sullivan, et al., "Programming with the Java Media Framework", Sean C. Sullivan, Loren Winzeler, Jeanine Deagen, and Deanna Brown, 1998, pp. 99.

"How Terminal Services Works", retrieved on May 1, 2008 at <<http://technet2.microsoft.com/windowsserver/en/library/2cb5c8c9-cadc-44a9-bf39-856127f4c8271033.mspx>>, Microsoft TechNet, updated Mar. 28, 2003, pp. 1-15.

Maharaj, "A Primitive Window System Using GDI+ and C#", retrieved May 1, 2008 at <<http://web.archive.org/web/20020605051526/http://www.csharphelp.com/archives2/archive306.html>>, pp. 1-3.

Olson, Robert, et al., "Remote Rendering Using Vtk and Vic," website at http://www-unix.mcs.anl.gov/fl/publications/vis00-vicvtk.pdf, 2 pages, published Sep. 19, 2000.

Engel, Klaus et al, "Remote 3D Visualization Using Image-Streaming Techniques" website at: http://citeseer.nj.nec.com/394248.html, 4 pages, published 1999.

Engel, K., et al., "Combining Local and Remote Visualization Techniques for Interactive Volume Rendering in Medical Applications" website at http://wwwvis.informatik.uni-stuttgart.de/eng/research/pub/pub2000/engel_vis00.pdf, published 2000.

Barth, et al., "Configuring Distributed Multimedia Applications Using Cinema", Multimedia Software Development, Proceedings International Workshop, IEEE, 1996, pp. 69-76.

* cited by examiner

RESOLVING A DISTRIBUTED TOPOLOGY TO STREAM DATA

TECHNICAL FIELD

The present invention generally relates to streaming data, and more particularly related to resolving a distributed topology to stream data.

BACKGROUND

Streaming data provides increased functionality to a user such that the user may quickly receive the data. Without streaming, if the entire amount of the data was needed to be received from a source device before it was output by a client device, the user may experience a delay in rendering the data at the client device. By streaming the data, the delay encountered by the user may be lessened. Data streaming may be used to provide "real-time" rendering of data.

To stream data, data is transmitted from a source device in a streaming or continuous fashion, generally using data packets, for rendering at a client device as the data arrives, as opposed to data that is not rendered until an entire file which includes the data is available at the client device. Streaming may be used for a variety of types of data, such as video data, audio data, media data, and the like. A stream of video data provides a sequence of "moving images" that are transmitted and displayed when the images arrive. Likewise, a stream of audio data provides sound data that is played as the audio data arrives. A stream of media data includes both audio and video data.

Previously, use of peripheral devices which involved the use of streams of data was accomplished in a local manner. For example, peripheral devices, such as source peripheral devices (such as cameras, microphones, and capture cards) and rendering devices (such as display monitors and speakers) were physically attached to a single computing device so that data streamed by the source peripheral device could be rendered by the rendering device. Rendering the data may include transforming the data into a form which is suitable to be output in a tangible form by a rendering device, such as displayed on a display device, played by an audio speaker, and so on.

If remote access to the streams of data was desired, the remote access was limited by the local manner in which the data was provided. For example, to provide remote access to data which was streamed by the source peripheral device, the data was output, compressed, decompressed, rendered, captured, and recompressed before it was streamed to a client device. However, when capturing and recompressing the data before streaming to the client device, portions of the data as output by the source peripheral device may be lost. Therefore, the data which was streamed to the client device was degraded. This reduced the experience of the user when viewing and/or listening to the data, such as by experiencing choppy movement in a display of video data and incomplete playback of audio data. Additionally, capturing and recompressing the data by the source device is resource intensive, thereby limiting such functionality to devices having sufficient processor and data storage resources. Further, capturing and recompressing the rendered data may slow the streaming of the data to the client device, thereby limiting the "real-time" nature of the data. Moreover, if more than one destination was desired for streams of data, the amount of resources which were used to support multiple streams was further increased.

Accordingly, there is a continuing need to improve the streaming of data.

SUMMARY

A distributed media session is described which, when executed, resolves a distributed topology that references software components for streaming data from a source device over a network to a client device. The distributed topology may be thought of as a framework or plan of software components that will be used to stream data from a source device over a network to a client device. Thus, when the software components of the distributed topology are executed, data is streamed from the source device to the client device over the network. A distributed software infrastructure of these software components may be built based on the distributed topology through execution of the distributed media session. Execution of the software components of the distributed software infrastructure allows data to be streamed from the source device over the network to the client device.

The distributed media session, when executed, may provide a federated (i.e. centralized) mechanism for resolving the distributed topology. For example, when executed, the distributed media session may take into account the capabilities of both the source and client devices when resolving the distributed topology. Additionally, the distributed media session, when executed, provides a federated mechanism for resolving the distributed topology such that the distributed media session may be executed by the client device, the source device, and/or a third party device. The executing of the distributed media session may also provide a federated mechanism for control. The software components, for instance, on both the source and client devices may be controlled by a single entity that represents such a federated mechanism.

BRIEF DESCRIPTION OF THE DRAWINGS

The same numbers are used throughout the disclosure and figures to reference like components and features.

DETAILED DESCRIPTION

Overview

A distributed media session (DMS) is described which, when executed, resolves a distributed topology that references software components for streaming data from a source device over a network to a client device. The distributed topology may be thought of as a software framework or plan for streaming data from the source device to the client device over the network using the referenced software components. When executed, the DMS may resolve the distributed topology by discovering the capabilities of the source device to stream data that is to be rendered and by discovering the capabilities of the client device to render the stream of data from the source device. From these two discoveries, the DMS builds a distributed topology that references software components that are suitable to stream data from the source device to the client device over the network. The distributed topology may then be utilized by the DMS to build a distributed software infrastructure that, when executed, allows data to be streamed from the source device over the network to the client device.

The DMS, when executed, may provide a federated, i.e. centralized, mechanism for resolving the distributed topology. For example, when executed, the DMS may take into account the capabilities of both the source and client devices when resolving the distributed topology. Additionally, the DMS provides a federated mechanism for resolving the distributed topology such that the DMS may be executed by the client device, the source device, and/or a third party device. The DMS may also provide a federated mechanism for control such that software components on both the source and client devices may be controlled by a single entity, such as by an application interacting with the DMS and/or the DMS itself.

Distributed Media Session (DMS)

Figure 1:
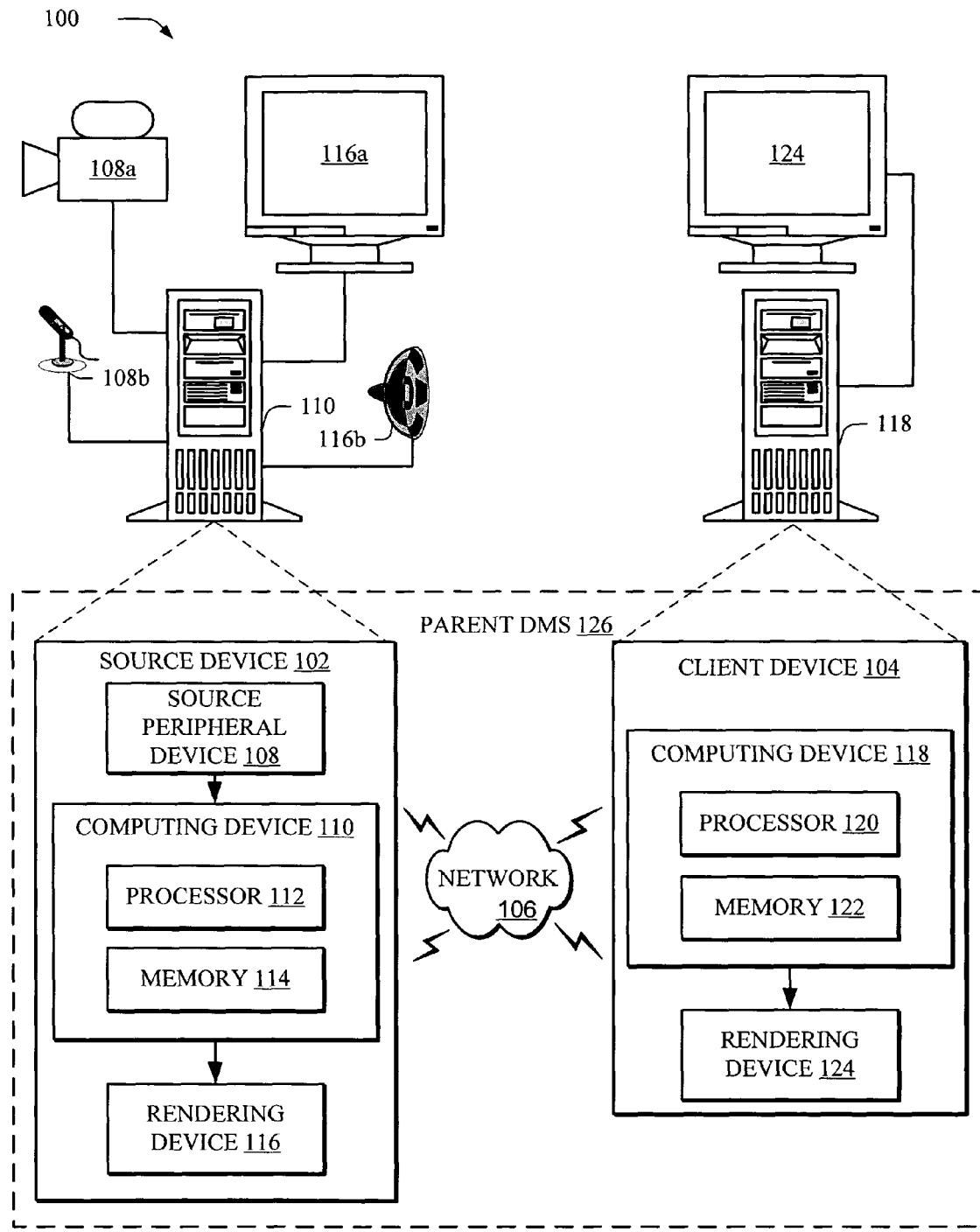
FIG. 1 is an illustration showing an exemplary implementation of a system that provides for streaming data that includes a parent distributed media session (DMS) for streaming data from a source device to a client device.

FIG. 1 is an illustration of an exemplary implementation showing a system 100 that streams data. The system 100 includes a source device 102 and a client device 104 which are communicatively coupled over a network 106. The network 106 may include any of a local area network (LAN), a wide area network (WAN), and the Internet.

The source device 102 provides a stream of data to be rendered. The source device 102 may include a source peripheral device 108 which outputs data. The source peripheral device 108 may be configured as a camera 108a, microphone 108b, capture card, and the like. The source device 102 may also include a computing device 110 which is communicatively coupled to the source peripheral device 108 over a local connection, such as by using a universal serial bus (USB) port, IEEE 1394 port, parallel port, and so on. The computing device 110 includes a processor 112 for executing one or more software components and a memory 114 for storing the software components and data. The source device 102 may also include a rendering device 116 for providing a tangible output of the data to a user interacting with the rendering device 116. The rendering device 116 may be configured in a variety of ways, such as a display device 116a, a speaker 116b, and the like. The rendering device 116 is also communicatively coupled to the computing device 110 using a local connection.

Although the source device 102 illustrated in FIG. 1 is configured to include a source peripheral device 108 which is communicatively coupled to a computing device 110, the source device 102 may be configured in a variety of ways. For example, the source device 102 may be configured as a network-ready device which does not include a separate computing device 110 to connect to the network 106, such as by including a processor, memory, and network hardware components itself. In another example, the source device 102 may be configured as a media server that provides a stream via a streaming protocol that is provided through execution of software by the source device 102.

The client device 104 may also include a computing device 118 having a processor 120 and a memory 122. The client device 104 includes a rendering device 124 to provide a tangible output of data which is communicatively coupled to the computing device 118 over a local connection. Like the source device 102, although the client device 104 is shown as including a separate computing device 118 and a separate rendering device 124, the client device 104 may be configured in a variety of ways. For instance, the client device 104 may be configured as a network-ready rendering device that does not include the full resources of the computing device 118. For example, the client device 104 may be configured as a low resource device that has limited processing and memory capabilities, such as a limited amount of RAM, no disk drive, and limited processing capabilities.

A parent distributed media session 126 (parent DMS) is included to allow the system 100 to stream data from the source device 102 over the network 106 to the client device 104. The parent DMS 126 is a software component that may be executed by the source device 102, the client device 104, and/or a third party device 2002 seen in FIG. 20. Through execution of the parent DMS 126, a distributed software infrastructure may be built to steam data over the network 106. The parent DMS 126, when executed, may discover the capabilities of both the source and client devices 102, 104. From these discovered capabilities, the parent DMS 126 may address a distribution of software components across both the client device 104 and the source device 102. Further discussion of software component distribution is found in the section titled "Resolving Distributed Topology", below. To aid the following discussion, further references to execution of the parent DMS 126 or other software component to perform an action will be made as if the parent DMS 126 or other software component performs the action.

Figure 2:
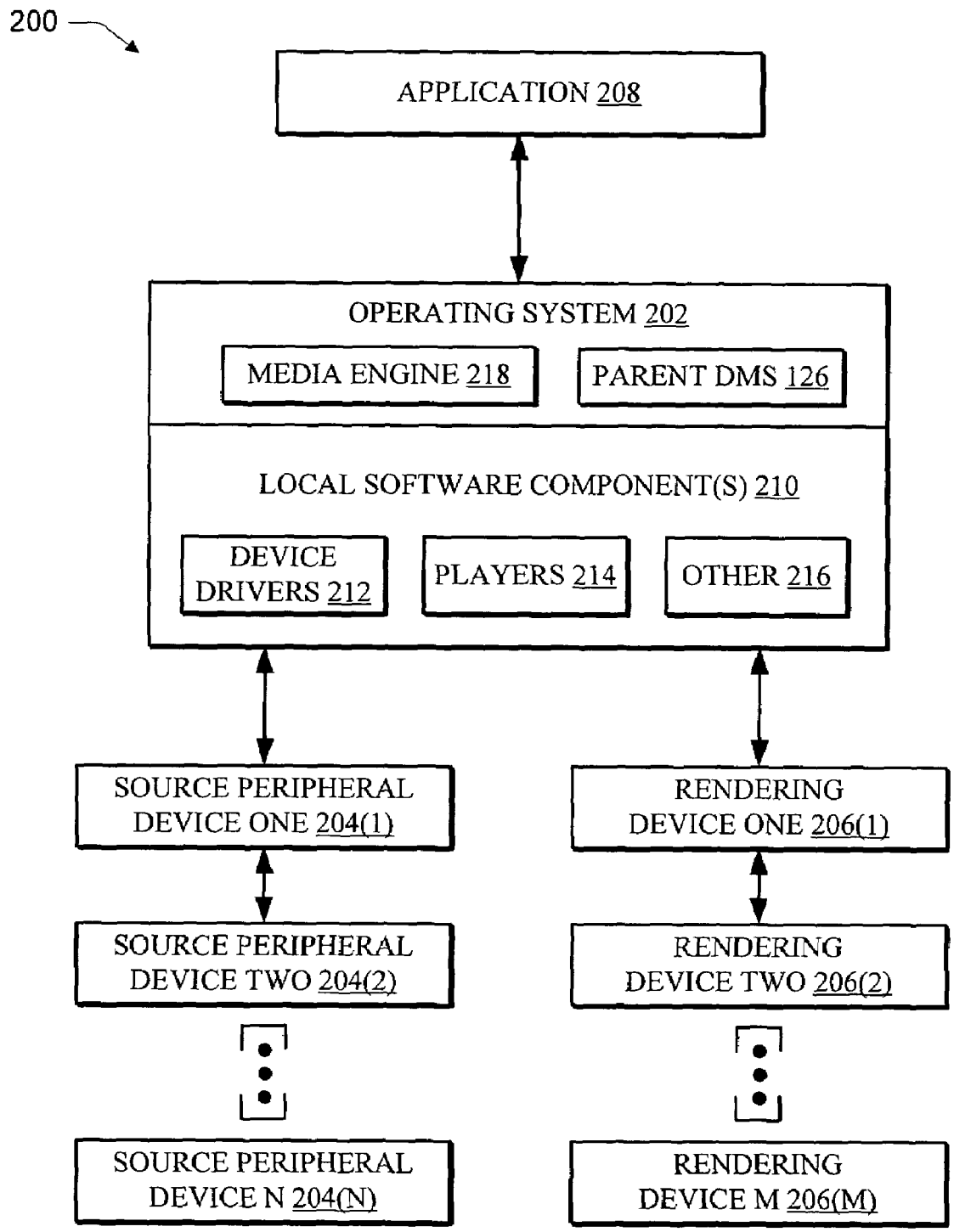
FIG. 2 is an illustration showing an exemplary implementation in which a computing environment utilizes the parent DMS of FIG. 1 to stream data.

FIG. 2 is an illustration of a computing environment 200 utilizing the distributed media session 126 to stream data. The parent DMS 126 may be included as a part of an operating system 202 that is executed on the source device 102 or the client device 104 shown in FIG. 1, as well as part of an operating system for a third party device 2002 seen in FIG. 20. The operating system 202 provides for organization and control of software and hardware, such as source peripheral devices 204(1)-204(N) and rendering devices 206(1)-206(M).

The parent DMS 126 may build on top of a local software infrastructure which includes local software components 210 used for input and/or output of streams of data. Local software components 210 may include device drivers 212, players 214 for output of a stream of data such as media players, and other 216 software components. The parent DMS 126 may manage these local software components 210 and stream data both to and from these local software components 210 over the network 106 shown in FIG. 1. Thus, the parent DMS 126 may complement the local software components 210 without replacing them.

A media engine 218 may be included to provide an interface between the application 208 and the parent DMS 126. The media engine 218 is utilized to present capabilities of the parent DMS 126 to the application 208. In other words, the media engine 218 defines an application programming interface (API) so that the application 208 may interact with the parent DMS 126 and vice versa. Additionally, the parent DMS 126 may utilize the media engine 218 to provide an interface for interaction with local software components 210. The media engine 218 may also be utilized to control flow of data between software components. The media engine 218, for instance, may route a stream of data between local software components 210, initiate execution of the local software components 210, and so on.

Remote Access and Federation

Additional complications may be encountered in the building and control of a distributed software infrastructure, as opposed to the building and control of local software components 210, in that the software components are executed on two or more devices in the distributed software infrastructure. Additionally, a variety of software components may be utilized in the distributed software infrastructure to stream data, which further complicates the building and control of the distributed software infrastructure. For example, the variety of software components may include local software components 210, media engines 218, transmitters, receivers, and the like, the use of which will be described in greater detail in the section titled "Resolving a Distributed Topology", below.

The parent DMS 126 provides a federated, i.e. centralized, approach for building a distributed software infrastructure that is suitable to stream data between two or more devices. This approach centralizes the planning process and may also centralize control of the software components. The parent DMS 126 may take into account the capabilities of both the source and client devices 102, 104 when building the distributed software infrastructure. This allows software components of both the source and client devices 102, 104 to be built and controlled in unison by the parent DMS 126. By using the federated approach, the parent DMS 126 may provide a distributed software infrastructure which is optimized to the capabilities of the source and client devices, as will be further discussed in relation to FIG. 25 below.

Figure 3:
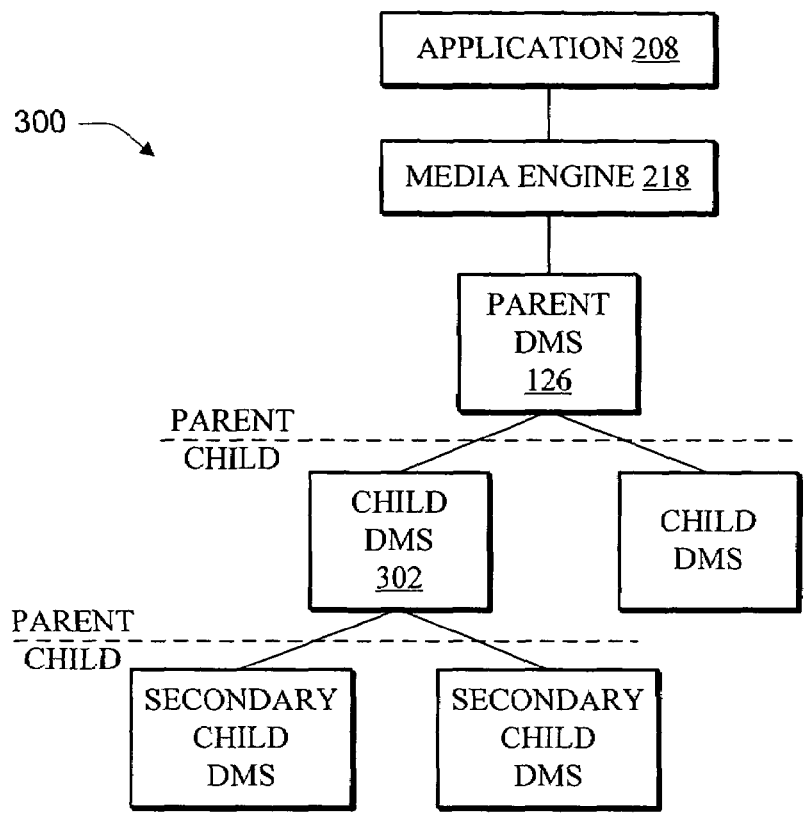
FIG. 3 is an illustration showing an exemplary implementation of parent-child relationships of the parent DMS of FIG. 1 with a child DMS.

Even though a federated approach may be taken to building the distributed topology, elements of building and control may be provided in separate portions of the distributed topology across multiple devices. For example, building and control may be delegated to devices having host affinities for the software components which are utilized to stream data from the source device 102 to the client device 104. This model is supported by the parent DMS 126 through use of parent-child relationships. Rather than attempting to directly control all of the software components of the distributed software infrastructure directly, the parent DMS 126 may create, e.g. instantiate, a child DMS 302 to which it delegates control, as shown in FIG. 3. The resulting structure can be a simple, single parent-child relationship as shown between the parent DMS 126 and the child DMS 302, or a more complex tree-like structure comprising several parent-child relationships as shown in FIG. 3.

Figure 4:
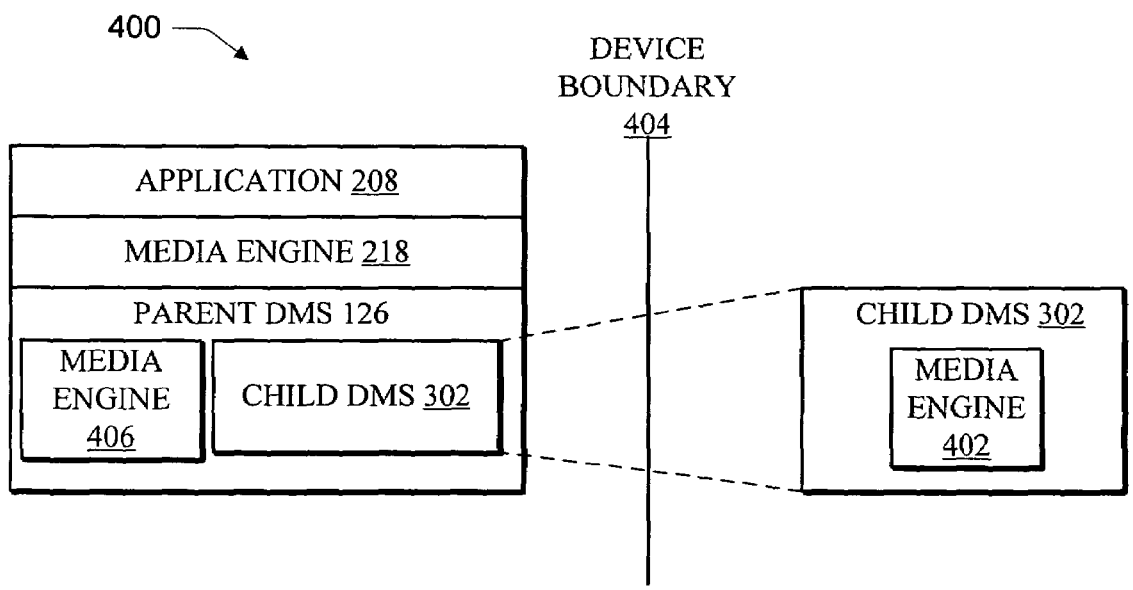
FIG. 4 is an illustration of an exemplary implementation which depicts the parent DMS that provides remote access functionality using a federated approach by employing the child DMS of FIG. 3.

FIG. 4 is an illustration of an exemplary implementation which depicts the parent DMS 126 as providing remote access functionality using a federated approach. The parent DMS 126 acts as a parent to host and control the child DMS 302. The parent DMS 126 may provide control over software components it hosts to the application 208 through the media engine 218. In this way, the parent DMS 126 provides remote access functionality of the streams of data to the application 208. For example, the parent DMS 126 hosts the child DMS 302, which includes a media engine 402 that is executed across a device boundary 404, i.e. is executed on a different device. Through the child DMS 302, the parent DMS 126 may control the media engine 402 across the device boundary 404. Thus, the child DMS 302 provides the functionality of the media engine 402 to the application 208 through the parent DMS 126, even though the media engine 402 is remote to the application 208.

The parent DMS 126 may also directly host a media engine 406. The parent DMS 126 has the ability to host several types of software components, which may include the media engine 406, child DMS 302, and local software components 210 shown in FIG. 2 which are used to interact with universal plug and play devices, legacy devices, and so on. By hosting multiple software components, the parent DMS 126 may aggregate control over the software components. Therefore, multiple software components may be controlled by the application 208 through interaction with the parent DMS 126.

The child DMS 302 may be configured in a variety of ways to provide different functionality. For example, the child DMS 302 may be created to address a situation in which the parent DMS 126 does not have direct access to a software component, e.g. the media engine 402, for which the child DMS 302 has access. Therefore, the child DMS 302 is hosted by the parent DMS 126 to provide access to the software component, e.g. the media engine 402. Additionally, the child DMS 302 may be created to exert control over a specified set of software components. For example, a separate child DMS may be provided for each type of data that is streamed, such as video data and audio data.

Ultimately, the parent DMS 126 may provide aggregated control of at least a portion of the distributed software infrastructure, as shown in FIG. 4. For example, the parent DMS 126 may control at least one software component located on each of the source and client devices 102, 104, respectively. The decision to produce the child DMS 302 is the result of resolving a distributed topology, which is discussed in the following section.

Resolving a Distributed Topology

Figure 5:
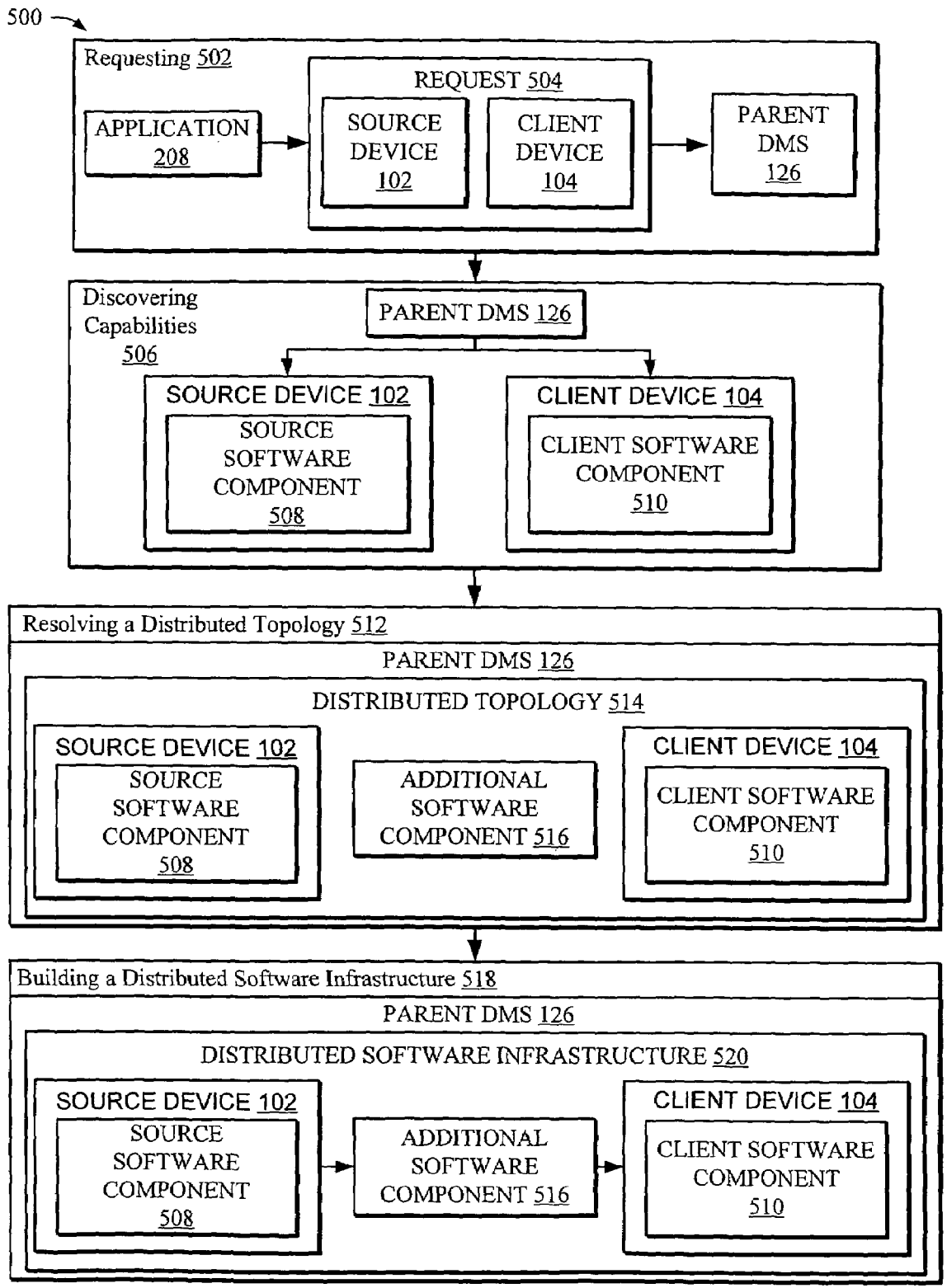
FIG. 5 is an illustration of an exemplary procedure in which the parent DMS of FIG. 1 builds a distributed software infrastructure for streaming data from a source device to a client device.

FIG. 5 is an illustration of an exemplary procedure 500 in which the parent DMS 126 builds a distributed software infrastructure for streaming data from the source device 102 to the client device 104. At block 502, a requesting step is shown wherein the application 208 sends a request 504 to the parent DMS 126 to stream data. The request references the source and client devices 102, 104 shown in FIG. 1.

The parent DMS 126 uses the request 504 to resolve a distributed topology that references software components that are suitable to stream data from the source device 102 to the client device 104. To resolve the distributed topology, the parent DMS 126 first discovers capabilities of the source device 102 and the client device 104, respectively, to interact with streaming data. For example, the DMS 126 may discover capabilities of the client device 104 to render data and capabilities of the source device 102 to stream the data to be rendered.

The capabilities may be discovered in a variety of ways. In the illustrated implementation at block 506, a discovering capabilities step is shown wherein the parent DMS 126 may examine the source device 102 to find a source software component 508 that involves, i.e. has as a feature or consequence, the streaming of data from the source device 102. Likewise, the parent DMS 126 may examine the client device 104 to find a client software component 510 that involves rendering data which is streamed to the client device 104. Examining the source and client devices 102, 104 may include finding software components which are exposed, e.g. made visible, by the source and client devices 102, 104 to the parent DMS 126.

In another implementation, the parent DMS 126 may discover capabilities of the source and client devices 102, 104 by querying a look-up table. The look-up table may return a result that specifies capabilities of the source and/or client devices 102, 104. The look-up table may reside as a part of the parent DMS 126 and/or elsewhere over the network 106 shown in FIG. 1, such as on the source device 102, client device 104, and/or an additional device (not shown) which is accessible over the network 106.

At block 512, a resolving a distributed topology step is shown wherein the parent DMS 126 derives a distributed topology 514 from the discovered capabilities of both the source and client devices 102, 104 found at block 506. The distributed topology 514 is a plan, e.g. a blueprint, which references software components that, when the software components are executed, stream data from the source device 102 to the client device 104. For example, the source software component 508 discovered by the parent DMS 126 in the source device 102 may be a driver for the source peripheral device 108 shown in FIG. 1. Additionally, the client software component 510 discovered in the client device 104 may be a media player which is used to provide data through a device driver for the rendering device 124 of the client device 104 shown in FIG. 1. Based on the discoveries the parent DMS 126 may derive an additional software component 516 that, when executed in conjunction with the source software component 508 and the client software component 510, streams data from the source device 102 to the client device 104. The parent DMS 126 derives the distributed topology 514 so that it includes the additional software component 516 based on the discovered capabilities of the source and client software components 508, 510. In the illustrated example, the distributed topology 514 references the source and client software components 508, 510 along with the additional software component 516. At this point distributed topology 514 provides a plan for streaming data from the source device 102 to the client device 104, but does not provide the actual distributed software infrastructure to do so.

At block 518, a building a distributed software infrastructure step is shown wherein the parent DMS 126 supplies the additional software component 516, based on the distributed topology 514, to build a distributed software infrastructure 520. The distributed software infrastructure 520 includes the additional software component 516 and the source and client software components 508, 510. The source, client and additional software components 508, 510, 516 of the distributed software infrastructure 520 are executed to stream data from the source device 102 to the client device 104. The additional software component 516 may be supplied in a variety of ways. For example, the additional software component 516 may be stored and retrieved by the parent DMS 126, such as from a local memory, memory located over the network 106 of FIG. 1, and the like.

In the illustrated example of FIG. 5, the parent DMS 126 starts with the request 504 which includes a reference to the source and client devices 102, 104. The parent DMS 126 then resolves from the request 504 the distributed topology 514 of block 512, which may then be used to build the distributed software infrastructure 520 of block 518. The steps described at blocks 502, 506, 512, 518 may be performed automatically by the parent DMS 126 without user intervention. The parent DMS 126 may resolve a variety of distributed topologies, such as a remote source distributed topology, a remote sink distributed topology and a third party distributed topology, each of which will be further discussed in the following sections.

Remote Source Distributed Topology

Figure 6:
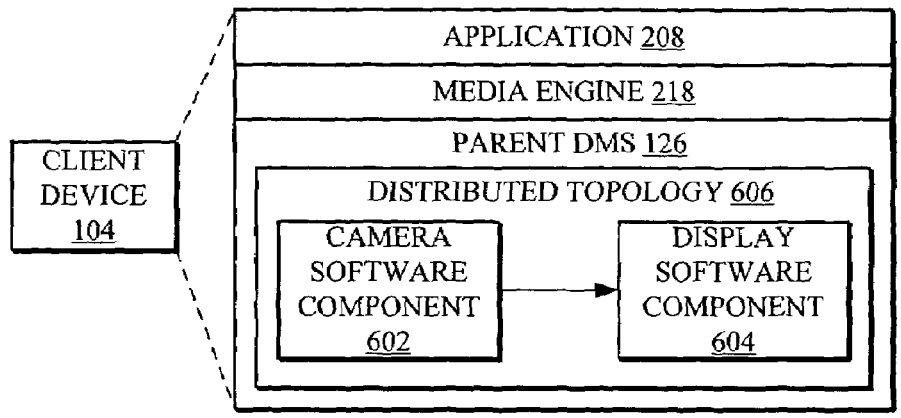
FIG. 6 is an illustration of an exemplary implementation of resolving a remote source distributed topology employing the procedure of FIG. 5.
Figure 7:
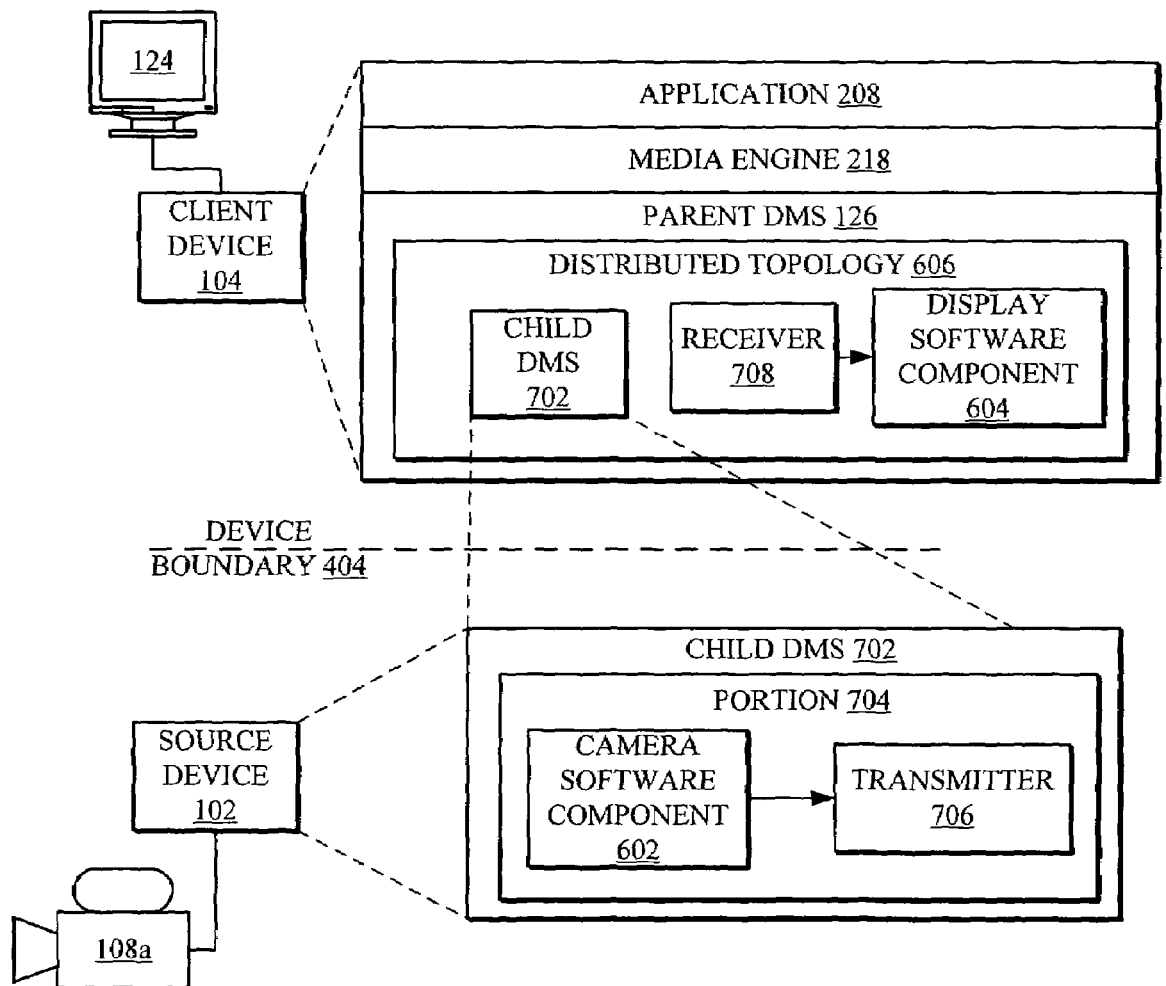
FIG. 7 is an illustration of the exemplary implementation of a remote source distributed topology that is further resolved from the remote source distributed topology of FIG. 6.
Figure 8:
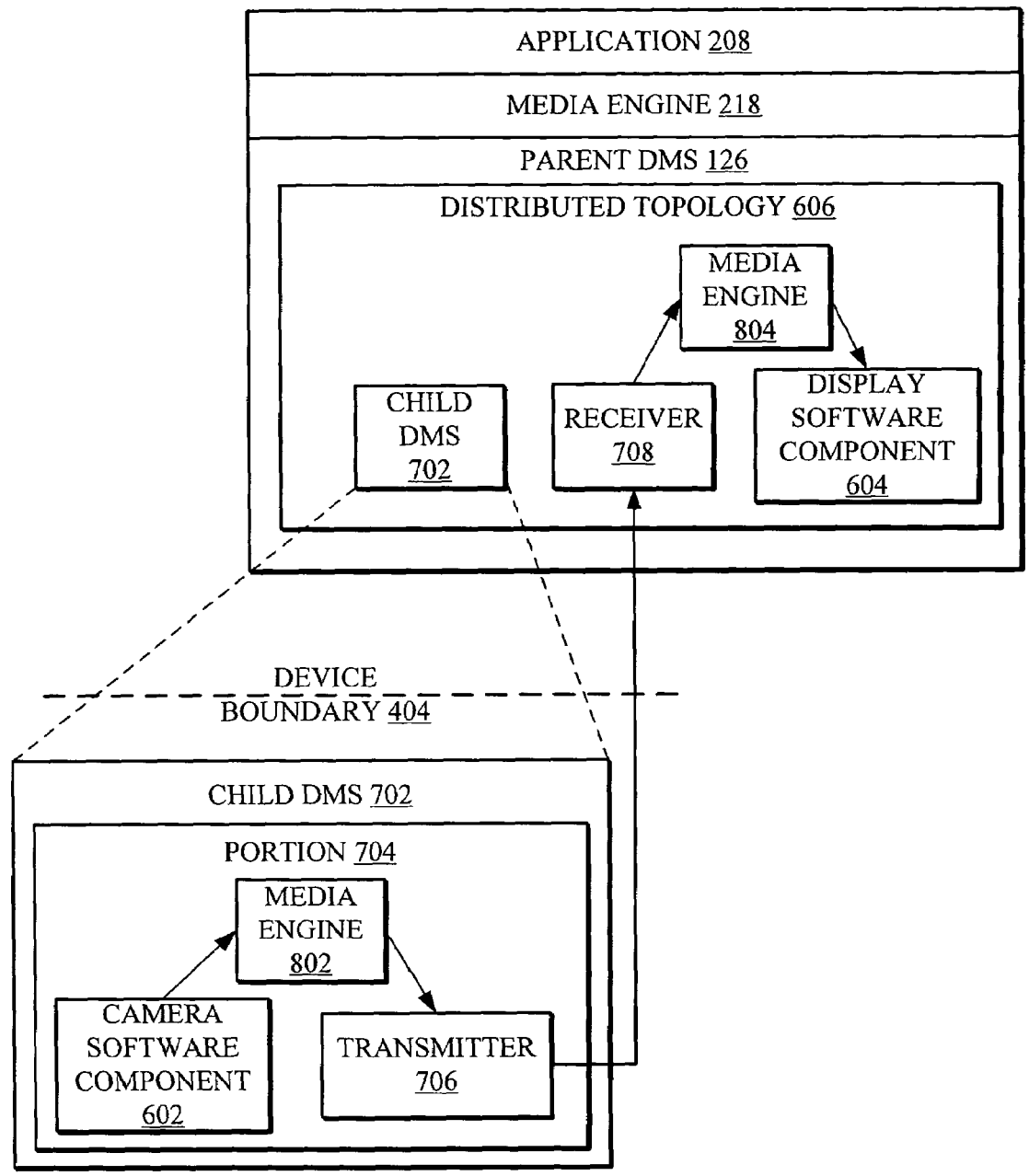
FIG. 8 is an illustration of the exemplary implementation of a remote source distributed topology that is fully resolved from the remote source distributed topology of FIG. 7.

FIGS. 6, 7 and 8 are illustrations of an exemplary implementation showing resolution of a remote source distributed topology. The remote source distributed topology refers to a distributed topology in which the source device 102 of the streaming data is remote, i.e. across the device boundary 404, from the client device 104 which hosts the parent DMS 126. The parent DMS 126 is executed by the client device 104 to resolve the distributed topology. The application 208 is also executed on the client device 104. An implementation is shown in FIG. 7, where the source device 102 includes the camera 108a and a camera software component 602, and the client device 104 includes the rendering device 124 and a display software component 604.

FIG. 6 illustrates an exemplary implementation of resolving a distributed topology at block 512 of procedure 500 of FIG. 5. The parent DMS 126 first creates a distributed topology 606 which includes the camera software component 602 and the display software component 604. The camera software component 602 references capabilities of the camera 108a of FIG. 7, such as local software components included on the camera 108a which stream data, and a network address of the camera 108a. Likewise, the display software component 604 may be used to reference capabilities, such as which local software components are included on the rendering device 124 of FIG. 7 to render data and a network address of the rendering device 124.

The distributed topology 606 shown in FIG. 6 is partial because all the software components are not referenced that will be used to provide streaming data. As previously stated, the distributed topology 606 is a plan for a distributed software infrastructure and, as such, does not include the actual software components which will be implemented. For example, the distributed topology 606 references software components that will be used by the parent DMS 126 to provide the distributed software infrastructure for streaming data from the camera 108a to the rendering device 124 of FIG. 7. These references may be used by the parent DMS 126 to supply software components referenced in the distributed topology 606 to build a distributed software infrastructure as discussed in relation to FIG. 5.

In the illustrated example of FIG. 7, the camera 108a and the rendering device 124 are not locally connected to each other, but are instead connected over the network 106 shown in FIG. 1. As was discussed in the section titled "Remote Access and Federation" and FIG. 3, federation may involve segmenting the distributed topology 606 by delegating control to the child DMS 302 that will control local software components that will be used to stream data in the distributed software infrastructure. For example, as shown in FIG. 7, the distributed topology 606 is segmented to include a child DMS 702 being created on the remote source, i.e. the source device 102, which is separated by the device boundary 404 from the client device 104.

The child DMS 702 includes a portion 704 of the distributed topology 606 which will also undergo a resolution step. For example, resolving the portion 704 may include adding a reference to a transmitter 706 that is a software component that is controlled by the parent DMS 126 through the child DMS 702. Likewise, resolving the distributed topology 606 may also include adding a reference to a receiver 708 which is a software component that is directly controlled by the parent DMS 126. The transmitter 706 streams data across the device boundary 404. The receiver 708 receives the data which was streamed across the device boundary 404. Data may be streamed between the transmitter and receiver 706, 708 in a variety of ways. For example, data may be "pushed" to the receiver 708 by the transmitter 706, such as by streaming data to a network address. Data may also be "pulled" from the transmitter 706 by the receiver 708, such as by retrieving a stream of data from a network address.

FIG. 8 illustrates the distributed topology 606 of FIGS. 6-7 as fully resolved. In this instance, a media engine 802 is referenced in the portion 704 of the distributed topology 606 to control streaming of data from the camera software component 602 to the transmitter 706. Another media engine 804 is included in the distributed topology 606 to control streaming of data from the receiver 708 to the display software component 604. The arrows illustrated in FIG. 8 depict the streaming of the data.

Figure 9:
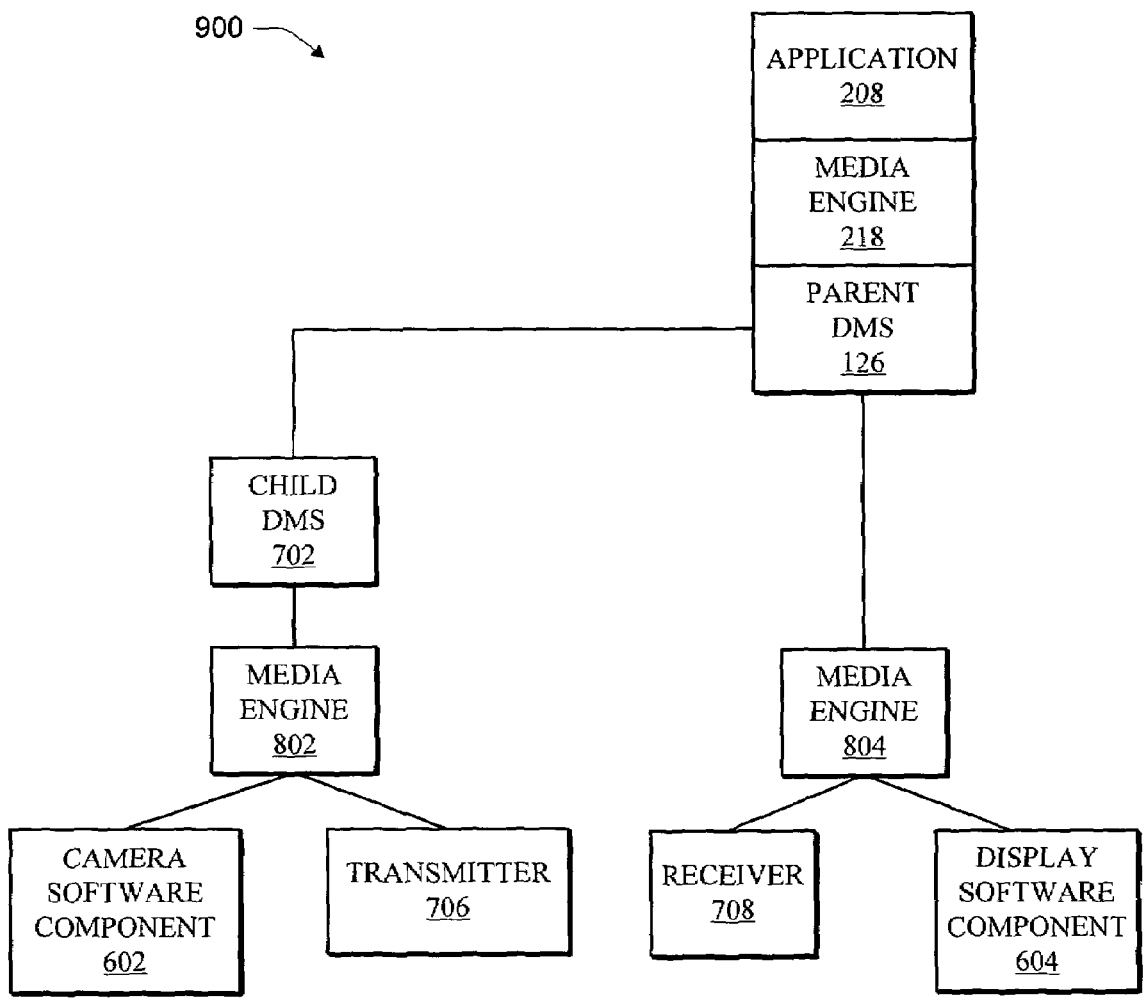
FIG. 9 is an illustration of a hierarchy of control in the exemplary implementation shown in FIG. 8.

FIG. 9 is an illustration of a hierarchy of control 900 of software components in the distributed topology 606 shown in FIG. 8. The distributed topology 606 as shown in FIG. 8 is resolved such that the parent DMS 126 has control over all the software components of the distributed topology. Therefore, the parent DMS 126 will have control over a distributed software infrastructure that is built from the distributed topology 606. For instance, the parent DMS 126 has control over the camera software component 602, the media engine 802 and the transmitter 706 through use of the child DMS 702. In this instance, the child DMS 702 resides on the source device 102 as shown in FIG. 7. The parent DMS 126 also has control over the receiver 708, media engine 804 and display software component 604 which are included with the parent DMS 126 on the client device 104 as shown in FIG. 7. Thus, the parent DMS 126 will have control over a distributed software infrastructure that may be built from the distributed topology 606, and may provide this control to the application 208 which is interacting with the parent DMS 126 through the media engine 218.

Remote Sink Distributed Topology

Figure 10:
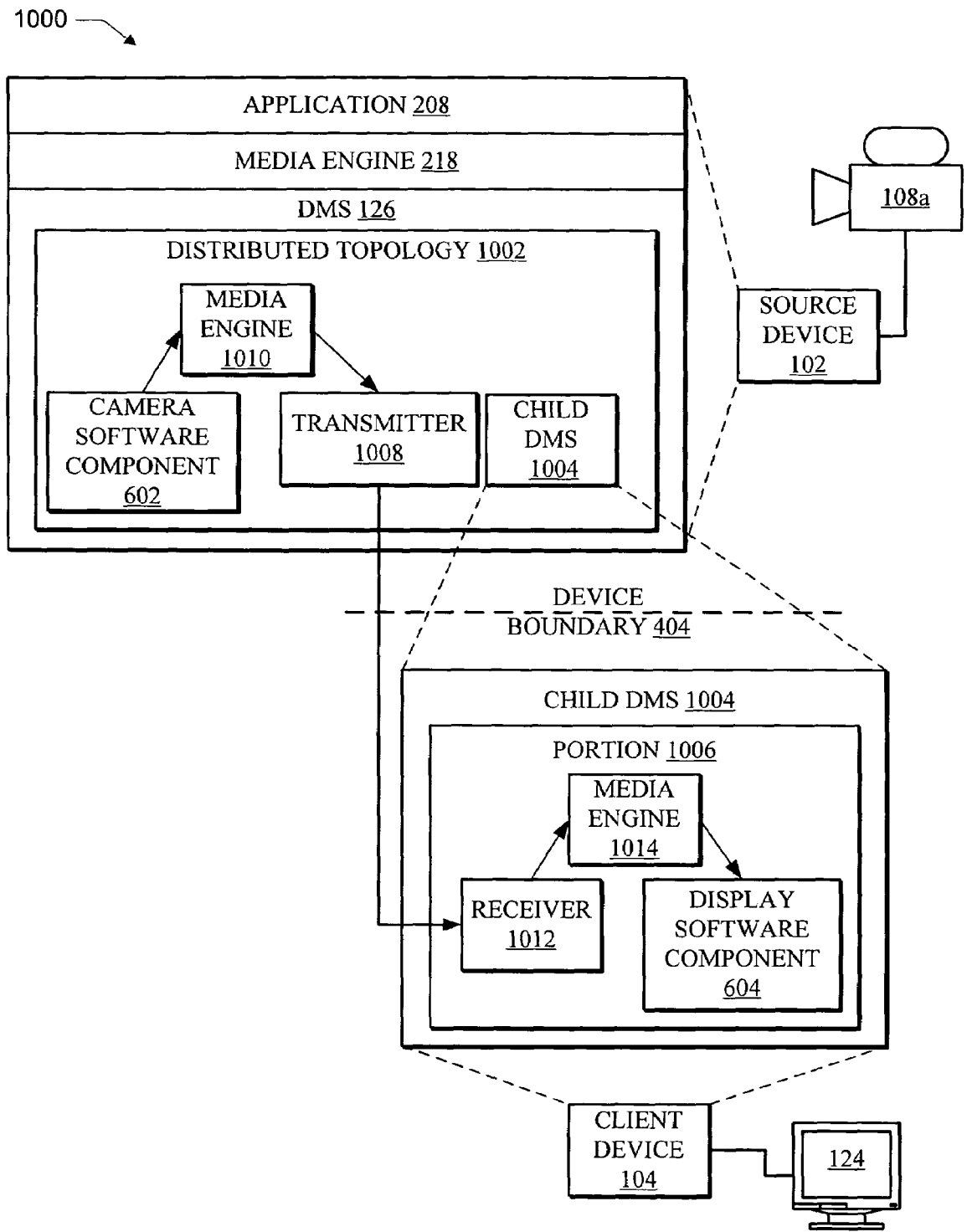
FIG. 10 is an illustration of an exemplary resolved remote sink distributed topology that is resolved through the procedure of FIG. 5.

FIG. 10 is an illustration of an exemplary implementation showing a resolved remote sink distributed topology 1000??. The remote sink distributed topology 1000? refers to a distributed topology in which the client device 104 is remote, i.e. across a device boundary 404, from the source device 102 which executes the parent DMS 126. The parent DMS 126 is executed by the source device 102 to resolve the distributed topology. The distributed topology for a remote sink scenario is effectively a mirror image of the remote source scenario as described in relation to FIGS. 6-9.

A distributed topology 1002 is resolved which references the camera software component 602 and display software component 604 of the camera 108a and rendering device 124 as described in the previous implementation shown in FIGS. 6-9. As before, the parent DMS 126 segments the distributed topology 1002 by creating a child DMS 1004 on the client device 104 which is separated from the source device 102 that is hosting the parent DMS 126 across the device boundary 404. The child DMS 1004 includes a portion 1006 of the distributed topology 1002. The distributed topology 1002 references a transmitter 1008 and a media engine 1010 for inclusion on the source device 102, and a receiver 1012 and a media engine 1014 for inclusion on the client device 104.

Figure 11:
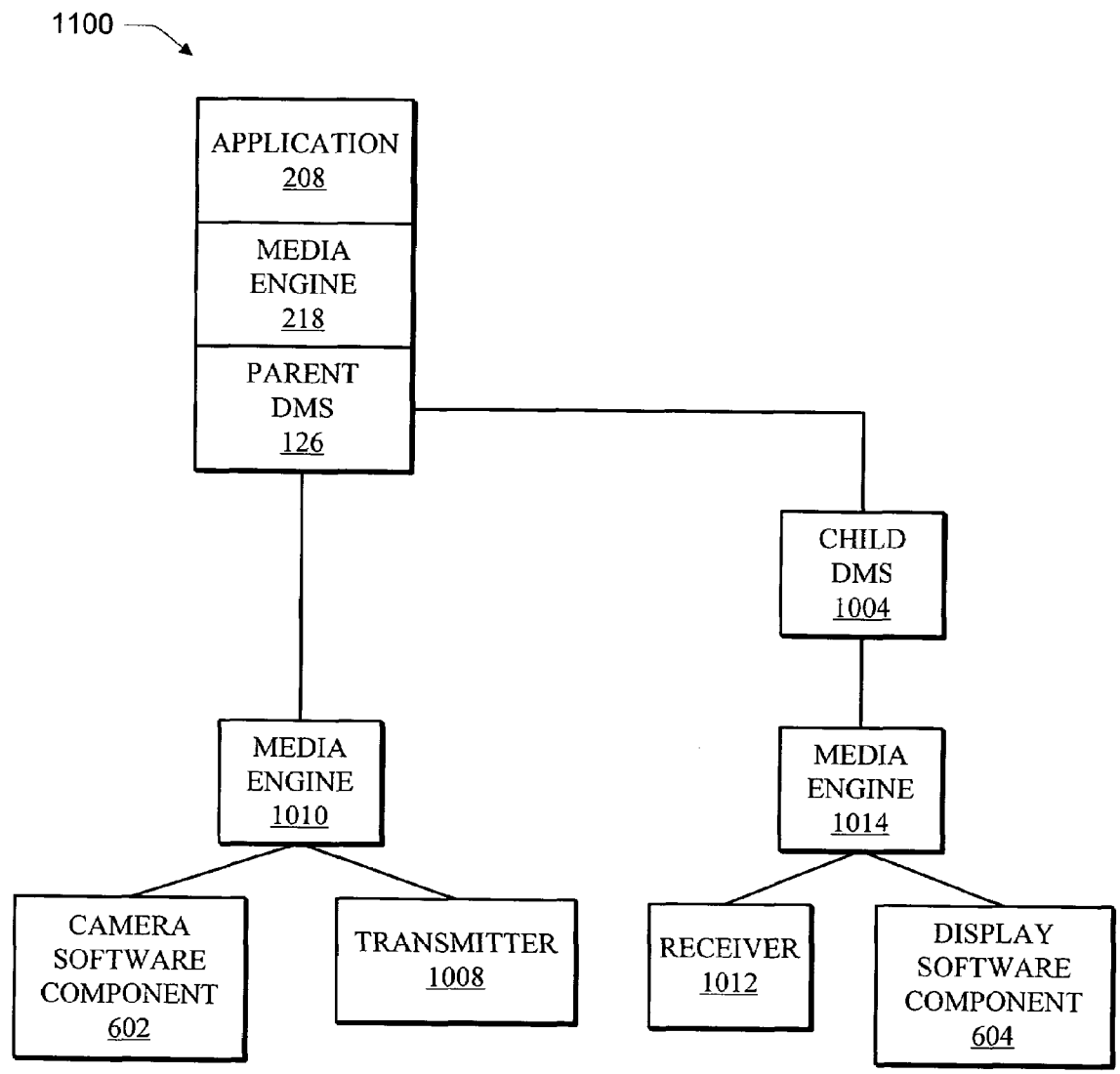
FIG. 11 is an illustration of a hierarchy of control in the exemplary implementation shown in FIG. 10.

FIG. 11 is an illustration of a hierarchy of control 1100 of software components referenced in the remote sink distributed topology 1000 shown in FIG. 10. The parent DMS 126 has control over a distributed software infrastructure that may be formed from the distributed topology 1002 of FIG. 10. For instance, the parent DMS 126 has direct control over the camera software component 602, the media engine 1010 and the transmitter 1008. The parent DMS 126 also has control over the receiver 1012, the media engine 1014 and the display software component 604 which are included with the child DMS 702 on the client device 104 as shown in FIG. 10. Thus, the parent DMS 126 has control over the distributed software infrastructure that may be built from the distributed topology 1002. The application 208, interacting with the parent DMS 126 through the media engine 218, may then also control a distributed software infrastructure formed from the distributed topology 1002 of FIG. 10.

In both of the previous implementations of the remote source distributed topology and the remote sink distributed topology, the parent DMS 126 provides control over the entire distributed software infrastructure built from the distributed topologies. There may be instances, however, in which control over the entire distributed software infrastructure is not provided, as will be discussed in the following section.

Source and Sink Proxy Software Components for Use in Distributed Topologies

Figure 12:
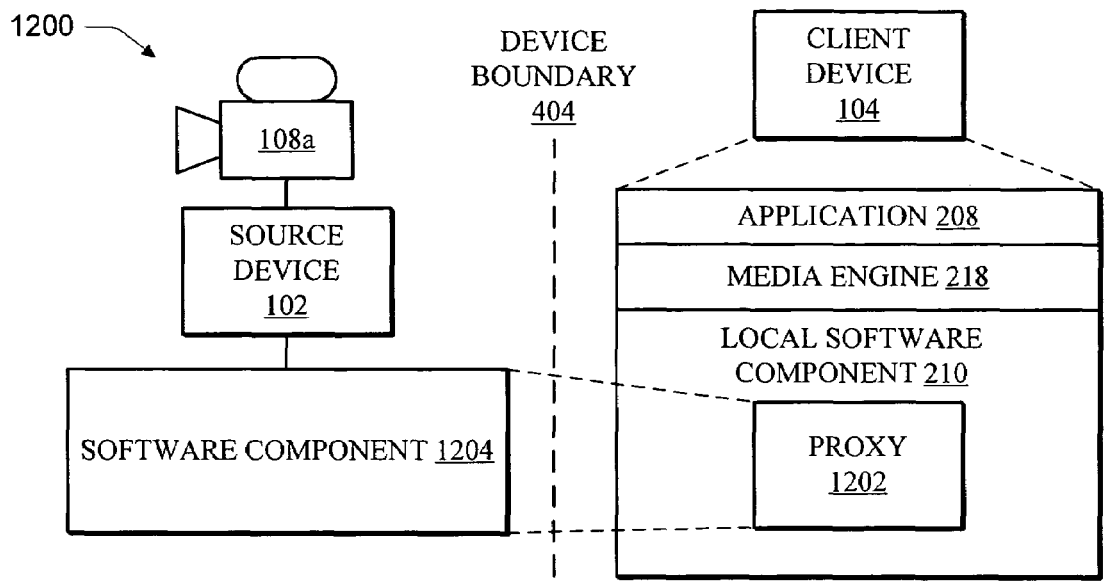
FIG. 12 is an illustration of exemplary implementation of a proxy being executed on the client device of FIG. 1.

FIG. 12 is an illustration of an exemplary implementation 1200 of a proxy 1202. The proxy 1202 is a software component through which the parent DMS 126 (not shown) may provide interaction to the application 208 with a software component 1204 that is located on a different device, e.g. across the device boundary 404, from the application 208. The proxy 1202 is utilized to present the streaming data to the application 208 as if the data was provided locally through use of a local software component 210. Thus, the application 208 may receive streaming data from the camera 108a as though the camera 108a and its corresponding software component 1204 were executed on the client device 104.

Figure 13:
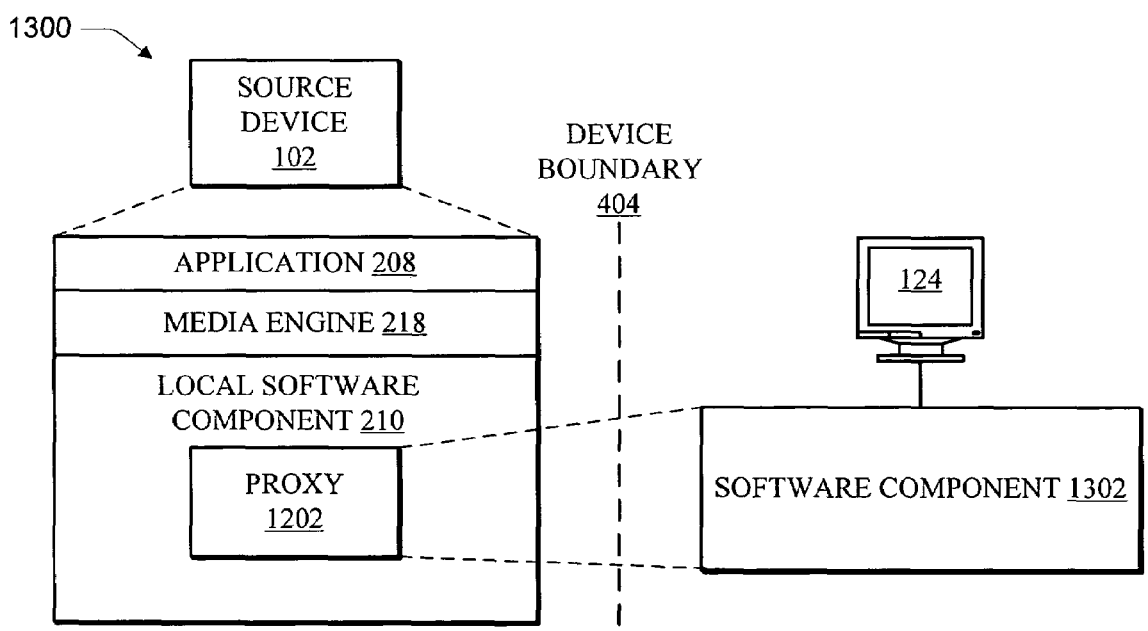
FIG. 13 is an illustration of exemplary implementation of a proxy being executed on the source device of FIG. 1.

FIG. 13 is an illustration of an additional exemplary implementation 1300 of the proxy 1202. The proxy 1202 may also be utilized to receive and stream data across the device boundary 404 to a software component 1302. For example, the proxy 1202 may stream data to the software component 1302 for display on the rendering device 124 as though the software component 1302 was a local software component 210 being executed on the source device 102.

The proxy 1202 may be utilized in instances in which control over all the software components of the distributed software infrastructure is not provided by the parent DMS 126 (not shown). Therefore, through use of the proxy 1202, a federated model is utilized in the resolving of the distributed topology by the parent DMS 126, but a federated model is not utilized in control as was the case in relation to FIGS. 6-11.

Figure 14:
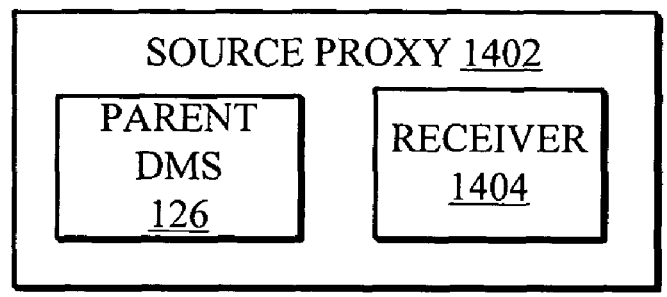
FIG. 14 is an illustration showing an exemplary implementation of the proxy of FIG. 12 configured as a source proxy.

FIG. 14 is an illustration showing an exemplary implementation 1400 of a source proxy 1402. The source proxy 1402 includes the parent DMS 126 and a receiver 1404. The parent DMS 126 is used for control of remote software components that reside on the source device 102 shown in FIG. 12. The receiver 1404 receives data that is streamed by a transmitter (not shown) to the receiver 1206 as described previously.

Figure 15:
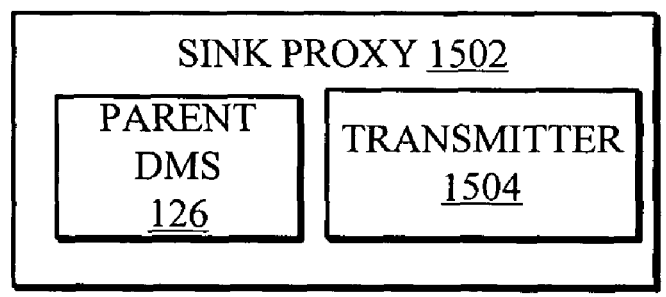
FIG. 15 is an illustration showing an exemplary implementation of the proxy of FIG. 13 configured as a sink proxy.

FIG. 15 is an illustration showing an exemplary implementation 1500 of a sink proxy 1502. The sink proxy 1502 includes the parent DMS 126 which is used for control of the software component 1302 that resides on the client device 104 as shown in FIG. 13. The transmitter 1504 streams data to a receiver (not shown) as described previously. The sink proxy 1502 may be used to stream data from a software component without using the parent DMS 126 to control the software component which is acting as a source of the data.

Figure 16:
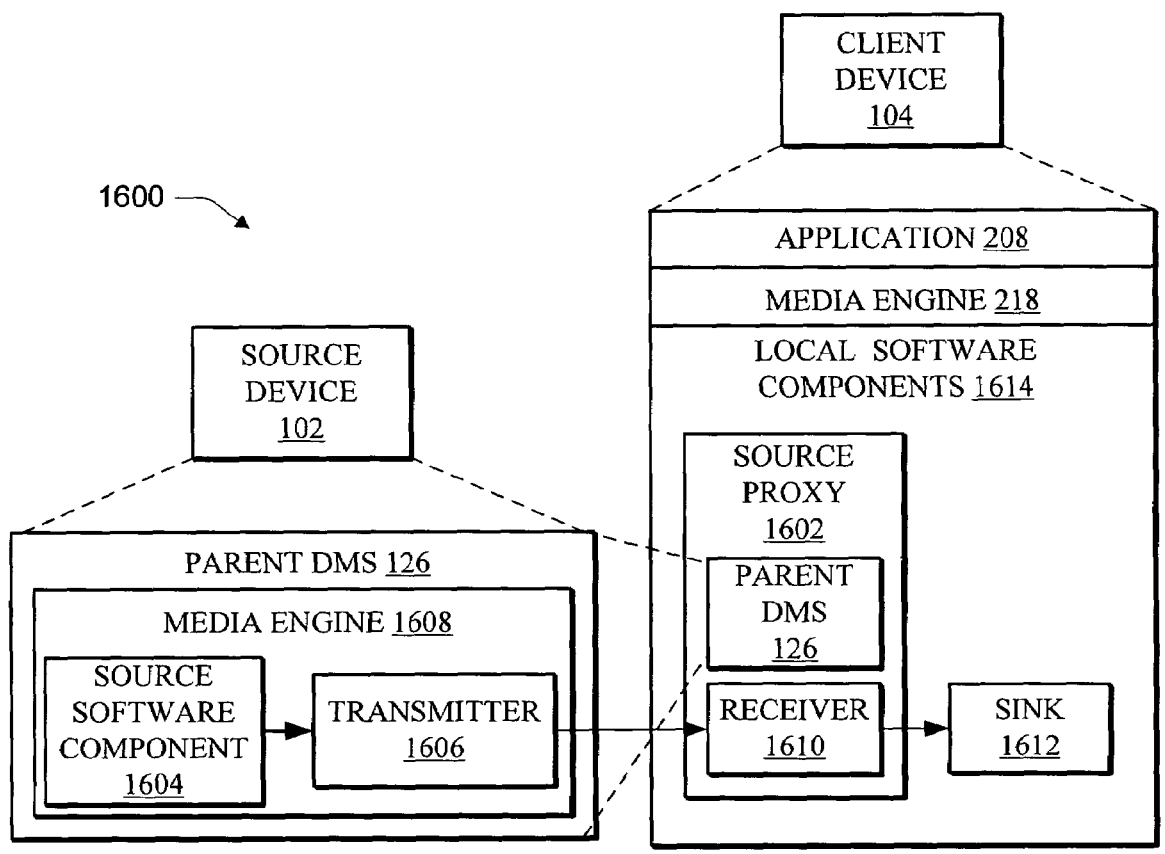
FIG. 16 is an illustration showing an exemplary implementation of a remote source distributed topology that includes the source proxy of FIG. 14.

FIG. 16 is an illustration of an exemplary implementation showing a remote source distributed topology 1600 that includes a source proxy 1602. The application 208 and media engine 218 are executed on the client device 104 as described in the remote source distributed topology shown in FIGS. 6-9. In this instance, however, the parent DMS 126 that receives the request from the application 208 to stream data will not be used for control of each of the software components of the source device 102 which involve the data to be streamed. In other words, the parent DMS 126 will not exert control over the entire distributed software infrastructure which is built from the distributed topology. Therefore, when resolving the distributed topology, the parent DMS 126 references the source proxy 1602 so that the data is streamed to the software component that is not controlled by the parent DMS 126.

The parent DMS 126 provides control over software components which reside on the source device 102 to stream data from the source device 102 to the client device 104 which hosts the parent DMS 126. For instance, the parent DMS 126 may control a source software component 1604 and a transmitter 1606 through use of a media engine 1608. The transmitter 1606 streams data to the receiver 1610 as previously described. The parent DMS 126, however, does not have control over the destination of the data, which in this instance will be referred to as a sink 1612. The sink 1612 is a software component that is illustrated to indicate a destination for the data that is not controlled by the parent DMS 126. Therefore, the parent DMS 126 simply streams the data to the sink 1612 without controlling it. The application 208 may interact with the source proxy 1602 as though it is a local software components 1614, even though the parent DMS 126 controls software components that are remote to the application 208, e.g. located on the source device 102.

Figure 17:
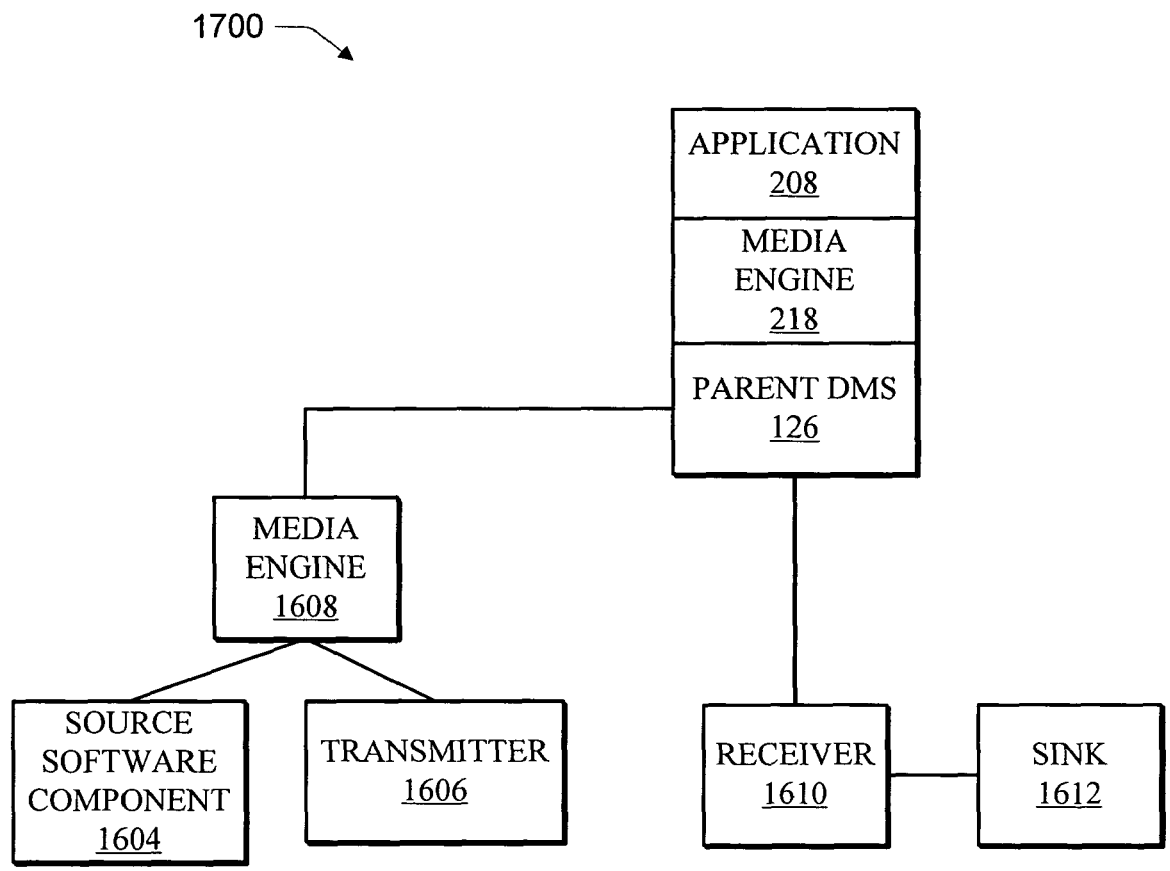
FIG. 17 is an illustration of an exemplary implementation that depicts a hierarchy of control in the remote source distributed topology as shown in FIG. 16.

FIG. 17 is an illustration which depicts a hierarchy 1700 of control in the remote source distributed topology 1600 as shown in FIG. 16. In the remote source distributed topology 1600, the parent DMS 126 provides control over the media engine 1608, source software component 1604, transmitter 1606 and receiver 1610 as previously described. Because the parent DMS 126 does not exert control over the sink 1612, the parent DMS 126 recognizes the sink 1612 as an outlet where the data is to be streamed, but is not controlled.

Figure 18:
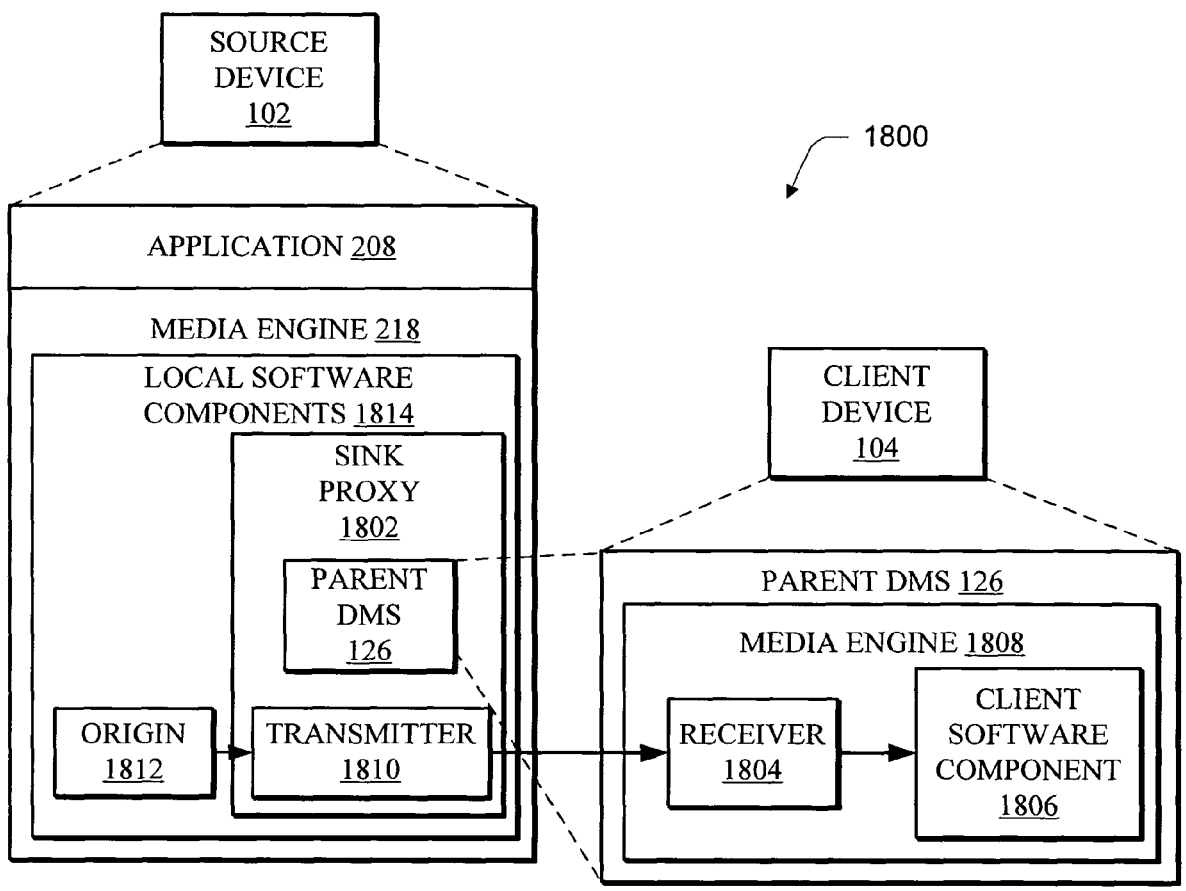
FIG. 18 is an illustration showing an exemplary implementation of a remote sink distributed topology that includes the sink proxy of FIG. 15.

FIG. 18 is an illustration showing an exemplary implementation of a remote sink distributed topology 1800 that includes a sink proxy 1802. The remote sink distributed topology 1800 is similar to the remote source distributed topology 1600. In this implementation, the application 208 and media engine 218 are executed on the source device 102 as described in relation to the remote sink distributed topology shown in FIGS. 10-11.

The parent DMS 126 that receives the request from the application 208 to stream data will not be used in a distributed software infrastructure for control of all of the software components of the client device 104 which involve the streaming of data. Therefore, the sink proxy 1802 is referenced by the parent DMS 126 in response to the request so that the data to be streamed may be received utilizing a software component over which the parent DMS 126 does not have control.

The parent DMS 126 provides control over software components that reside on the client device 104 that receives data streamed from the source device 102. For instance, the parent DMS 126 may control a receiver 1804 and a client software component 1806 through use of a media engine 1808. A transmitter 1810 is used to stream data to the receiver 1804 as previously described. The parent DMS 126, however, does not have control over all the software components which stream data, which in this instance will be referred to as an origin 1812. Therefore, the parent DMS 126 simply receives the data from the origin 1812 without controlling it. The application 208 may recognize the sink proxy 1802 as a local software component 1814.

Figure 19:
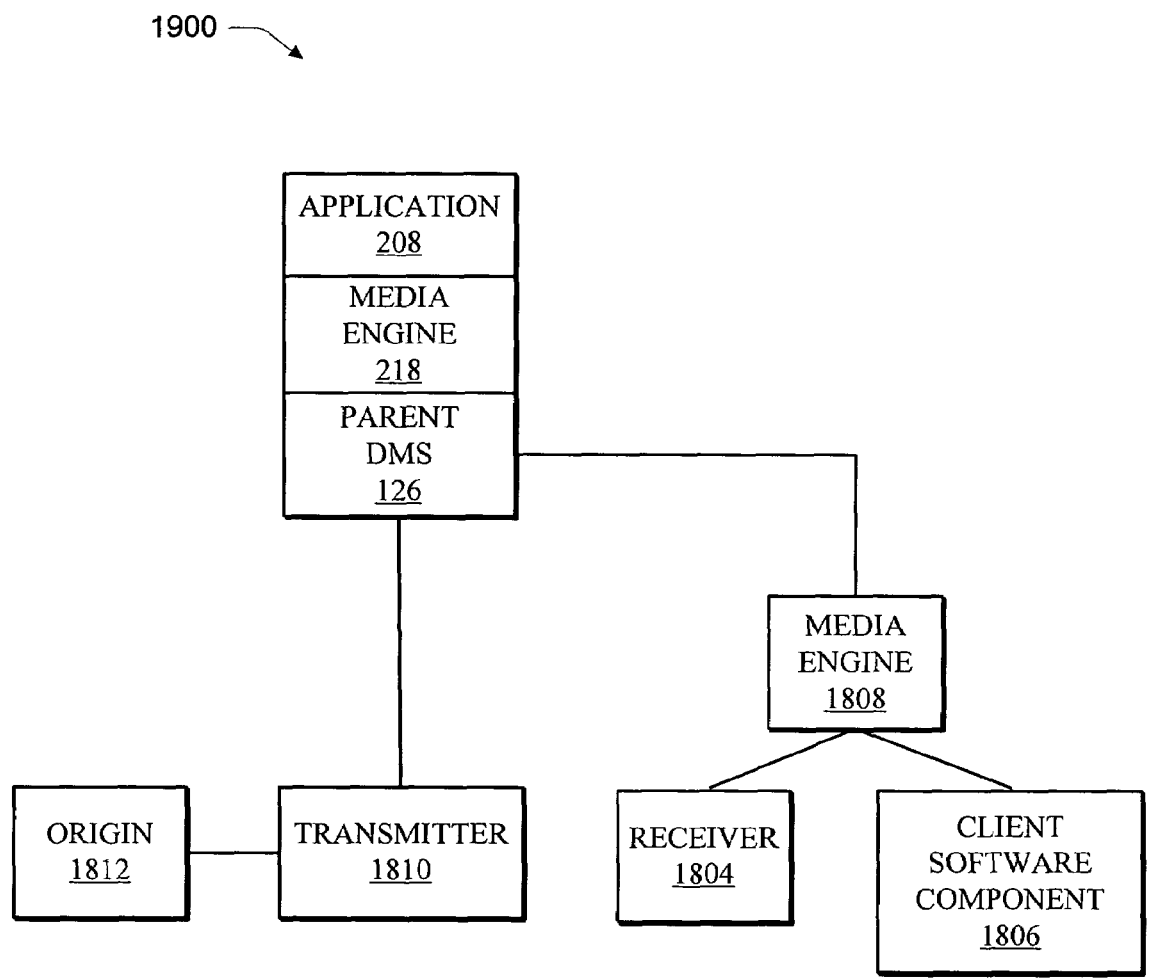
FIG. 19 is an illustration of an exemplary implementation which depicts a hierarchy of control in the remote sink distributed topology as shown in FIG. 18.

FIG. 19 is an illustration which depicts a hierarchy 1900 of control in the remote sink distributed topology 1800 shown in FIG. 18. The parent DMS 126 provides control over the media engine 1808, client software component 1806, receiver 1804 and transmitter 1810. Because the parent DMS 126 does not exert control over the origin 1812, the parent DMS 126 recognizes the origin 1812 as an inlet from which data is received, but over which the parent DMS 126 does not have control.

Third Party Distributed Topology

Figure 20:
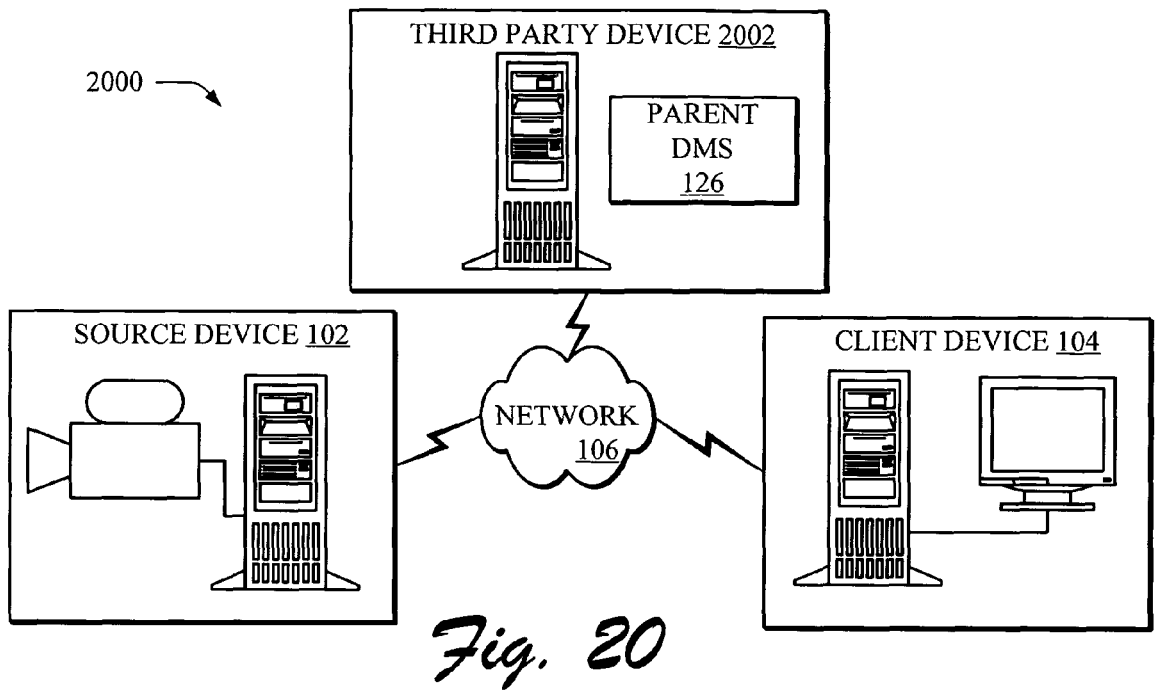
FIG. 20 is an illustration of an exemplary implementation in which a system is shown that includes a third party device that is communicatively coupled to source and client devices over the network of FIG. 1.

FIG. 20 is an illustration of an exemplary implementation in which a system 2000 is shown that includes the third party device 2002 which is communicatively coupled to the source and client devices 102, 104 over the network 106. In the previous implementations, distributed topologies were described in which resolution and control was provided by either the source device 102 or the client device 104. The third party device 2002 may also be utilized to execute the parent DMS 126 through use of the federated approach provided by the parent DMS 126. Therefore, the third party device 2002 may be utilized to resolve a distributed topology to stream data from the source device 102 to the client device 104.

Figure 21:
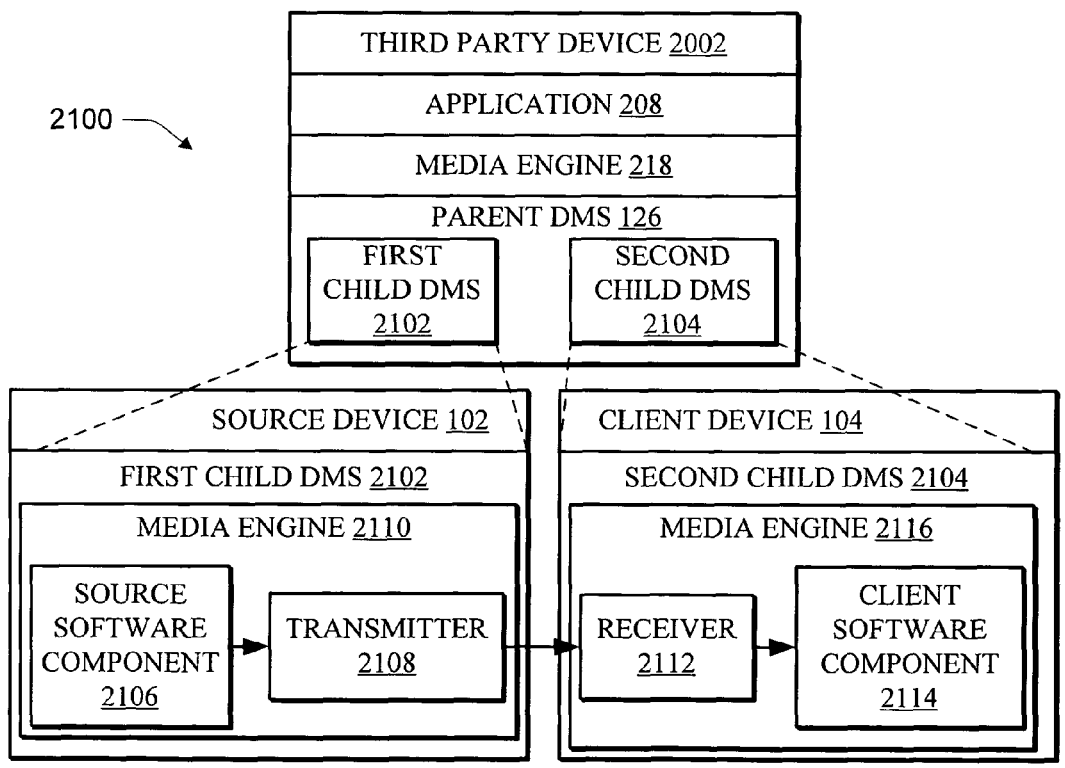
FIG. 21 is an illustration showing an exemplary implementation of a third party distributed topology implemented in the system shown in FIG. 20.

FIG. 21 is an illustration of an exemplary implementation in which a third party distributed topology 2100 is shown. The third party device 2002 executes the parent DMS 126 which receives a request from the application 208 through the media engine 218 to stream data from the source device 102 to the client device 104. The parent DMS 126 creates a first child DMS 2102 to resolve a portion of the distributed topology which includes the source device 102. The first child DMS 2102 also provides control over software components included on the source device 102. The parent DMS 126 also creates a second child DMS 2104 to resolve a portion of the distributed topology of the client device 104. The second child DMS 2104 provides control over software components included on the client device 104.

Figure 22:
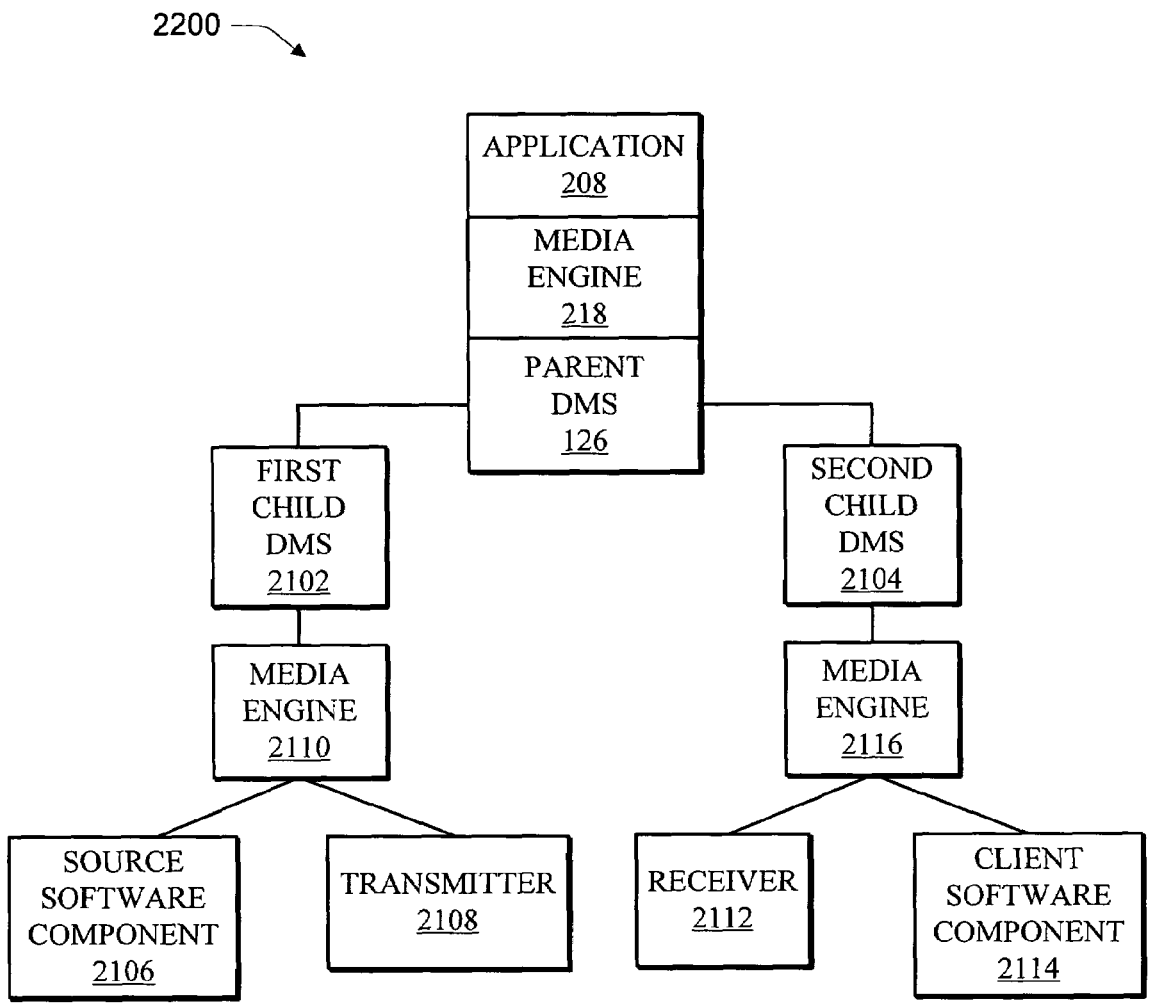
FIG. 22 is an illustration showing an exemplary implementation of a hierarchy of control in the implementation depicted in FIG. 21.

The first child DMS 2102 references a source software component 2106 and a transmitter 2108 which are controlled by a media engine 2110. The second child DMS 2104 references a receiver 2112 and a client software component 2114 which are controlled by a media engine 2116. FIG. 22 is an illustration of a hierarchy 2200 of control in the third party distributed topology 2100 depicted in FIG. 21. The hierarchy 2200 demonstrates that the parent DMS 126 provides control over the first child DMS 2102 and second child DMS 2104. The first child DMS 2102 provides control over the source software component 2106, the transmitter 2108 and the media engine 2100. The second child DMS 2104 provides control over the receiver 2112, the client software component 2114, and the media engine 2116.

The third party control distributed topology 2100 may be configured in a variety of ways. In the example illustrated in FIG. 21, the parent DMS 126 provides control over the software components which are located on the source and client devices 102, 104. The third party device 2002 of FIG. 20 may also execute the parent DMS 126 to resolve a distributed topology in which control is provided by either the source device 102 or the client device 104. Also, it should be noted that in the illustrated implementation shown in FIG. 21, the data is streamed from the source device 102 to the client device 104 without being streamed through the third party device 2002. In this way, the third party device 2002 may resolve a distributed topology that streams data without actually streaming the data itself. In additional implementations, data is streamed from the source device 102 through the third party device 2002 to the client device 104.

Distributed Topology Having Multiple Streams

Although the previous implementations were described in relation to a single stream of data to aid the discussion, multiple streams of data may be streamed by the parent DMS 126. For example, multiple source devices may be utilized, in which each of the source devices stream data to a single client device. Additionally, a single source device may stream multiple streams of data to one or more client devices. Likewise, multiple client devices may receive a single stream of data from a source device. Even though a single example of use of multiple streams of streaming data will be discussed, each of the distributed topologies and distributed software infrastructures previously discussed may support a plurality of streams of data.

Figure 23:
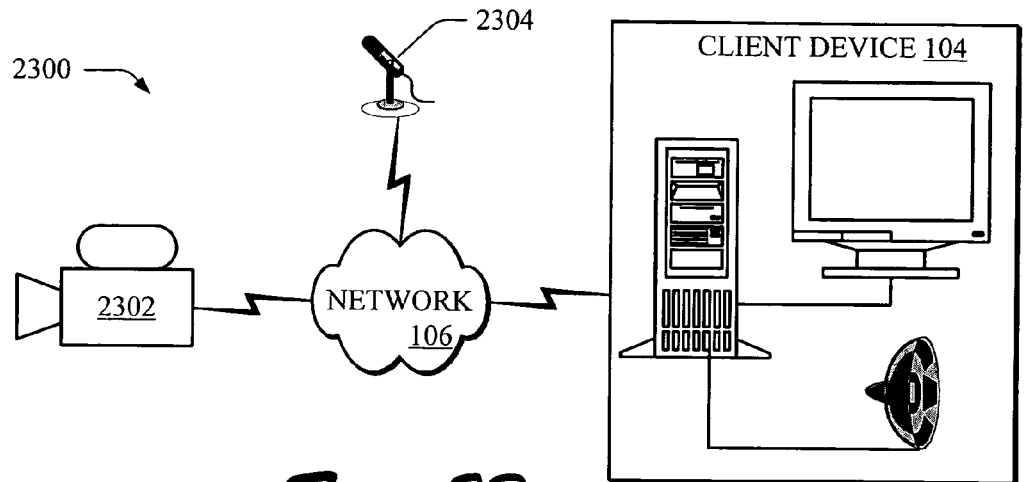
FIG. 23 is an illustration showing an exemplary implementation of a plurality of source devices that stream data to the client device of FIG. 1.

FIG. 23 is an illustration of an exemplary implementation of a system 2300 in which a plurality of source devices stream data to the client device 104. The system 2300 may include a first source device 2302 which is configured as a network-ready camera, e.g. it contains functionality which enables it to be communicatively coupled to the network 106. The system 2300 also includes a second source device 2304 which is configured as a network-ready audio input device, such as a network-ready microphone. The first source device 2302 streams video data and the second source device 2304 streams audio data for use by the client device 104. The first and second source devices 2302, 2304 may be configured in a variety of ways, such as universal plug-and-play (UPnP) devices.

Figure 24:
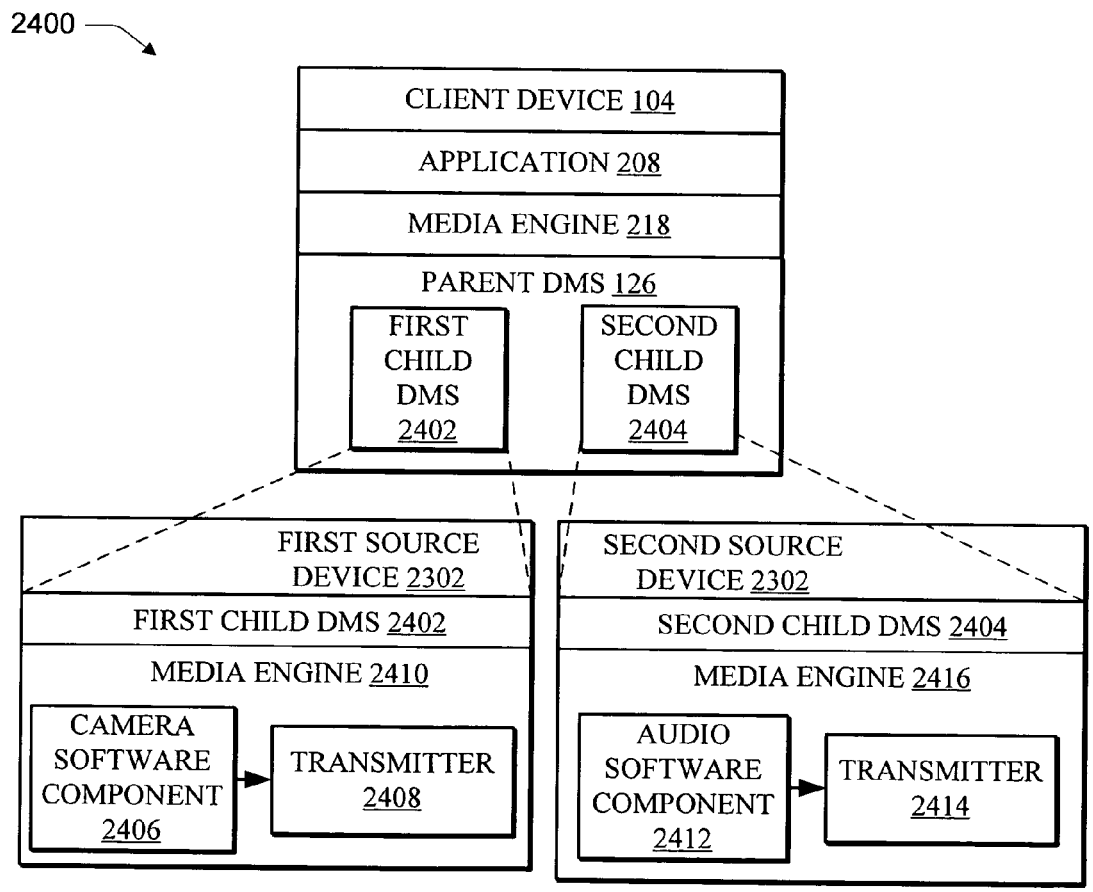
FIG. 24 is an illustration showing an exemplary implementation of a distributed topology resolved for the system of FIG. 23.

FIG. 24 is an illustration of an exemplary implementation showing a distributed topology for use in the system 2300 of FIG. 23. The client device 104 includes the application 208 which requests the streaming of data from both the first and second source devices 2302, 2304 for rendering at the client device 104. The parent DMS 126 receives the request through the media engine 218 and resolves a distributed topology for streaming the audio and video data.

The parent DMS 126 creates a first child DMS 2402 to resolve a portion of the distributed topology of the first source device 2302. The first child DMS 2402 also provides control of software components included on the first source device 2302. Additionally, the parent DMS 126 creates a second child DMS 2404 to resolve a portion of the distributed topology of the second source device 2302. The second child DMS 2404 also controls of software components included on the second source device 2302.

The first child DMS 2402 references a camera software component 2406 and a transmitter 2408 which are controlled by a media engine 2410. The second child DMS 2404 references an audio software component 2412 and a transmitter 2414 which are controlled by a media engine 2416. The parent DMS 126 may control the first and second child DMS 2402, 2404 to coordinate the streaming of the audio and video data to the client device 104.

Resolving Distributed Topologies in an Optimized Manner

Figure 25:
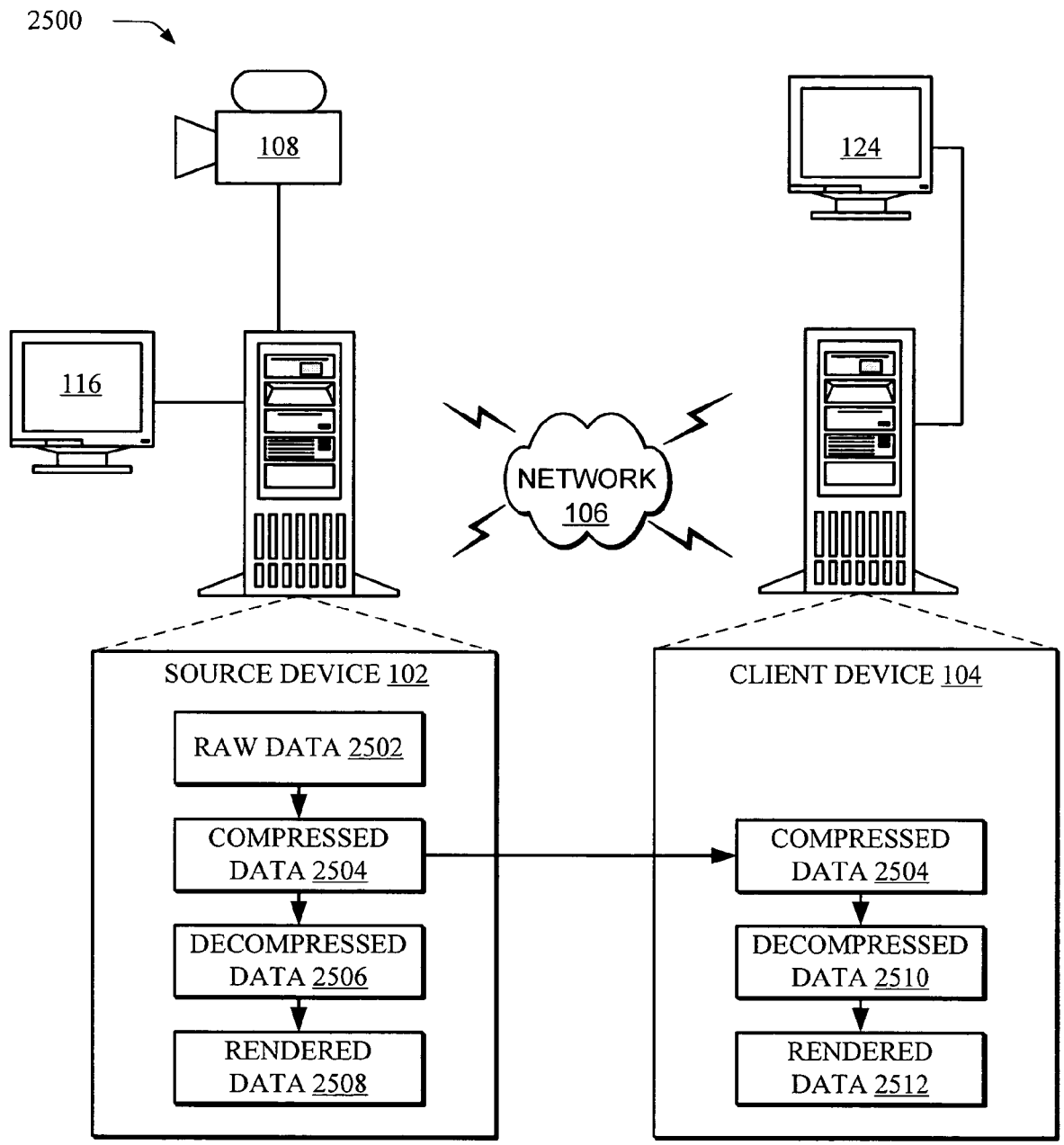
FIG. 25 is an illustration showing an exemplary implementation of a system in which execution of the distributed media session resolves the distributed topology, using the procedure of FIG. 5, in an optimized manner based on the capabilities of source and client devices to interact with streaming data.

FIG. 25 is an illustration of an exemplary implementation of a system 2500 in which the parent DMS 126 resolves the distributed topology in an optimized manner based on the capabilities of the source and client devices 102, 104 to interact with streaming data. To render data locally, the source device 102 may produce a raw stream of data 2502, i.e. data that has not been processed or subjected to analysis, from an included source peripheral device 108. The raw data 2502 is compressed to form compressed data 2504 so that the data may be transmitted and stored in an efficient manner. To interact with the compressed data, the source device 102 decompressed the compressed data 2504 to obtain decompressed data 2506. The decompressed data 2506 then went through a rendering step to form rendered data 2508, i.e. data that is suitable for output in a tangible form for interaction with by a user (such as displayed, played by an audio device, etc.).

The parent DMS 126 may provide an optimized distributed software topology by discovering the capabilities of both the source device 102 and the client device 104. For example, as illustrated in FIG. 25, the parent DMS 126 may resolve a distributed topology in which the compressed data 2504 obtained from the raw data 2502 is streamed to the client device 104. The client device 104 may then decompress the compressed data 2504 to form decompressed data 2510. The decompressed data 2510 is then rendered to form rendered data 2512 for use by the rendering device 124.

Optimization of the distributed topology may be used to provide a distributed software infrastructure that distributes the resources used to stream data. For example, rather than provide the source device 102 with sufficient hardware and software resources to decompress and render, this functionality may be provided by the client device 104. Additionally, the compressed data 2504 may be compressed in such a way as to be encrypted. By providing for the encryption of compressed data 2504, the data remains encoded, and therefore, may be safely streamed over the network 106.

Exemplary Procedure

Figure 26:
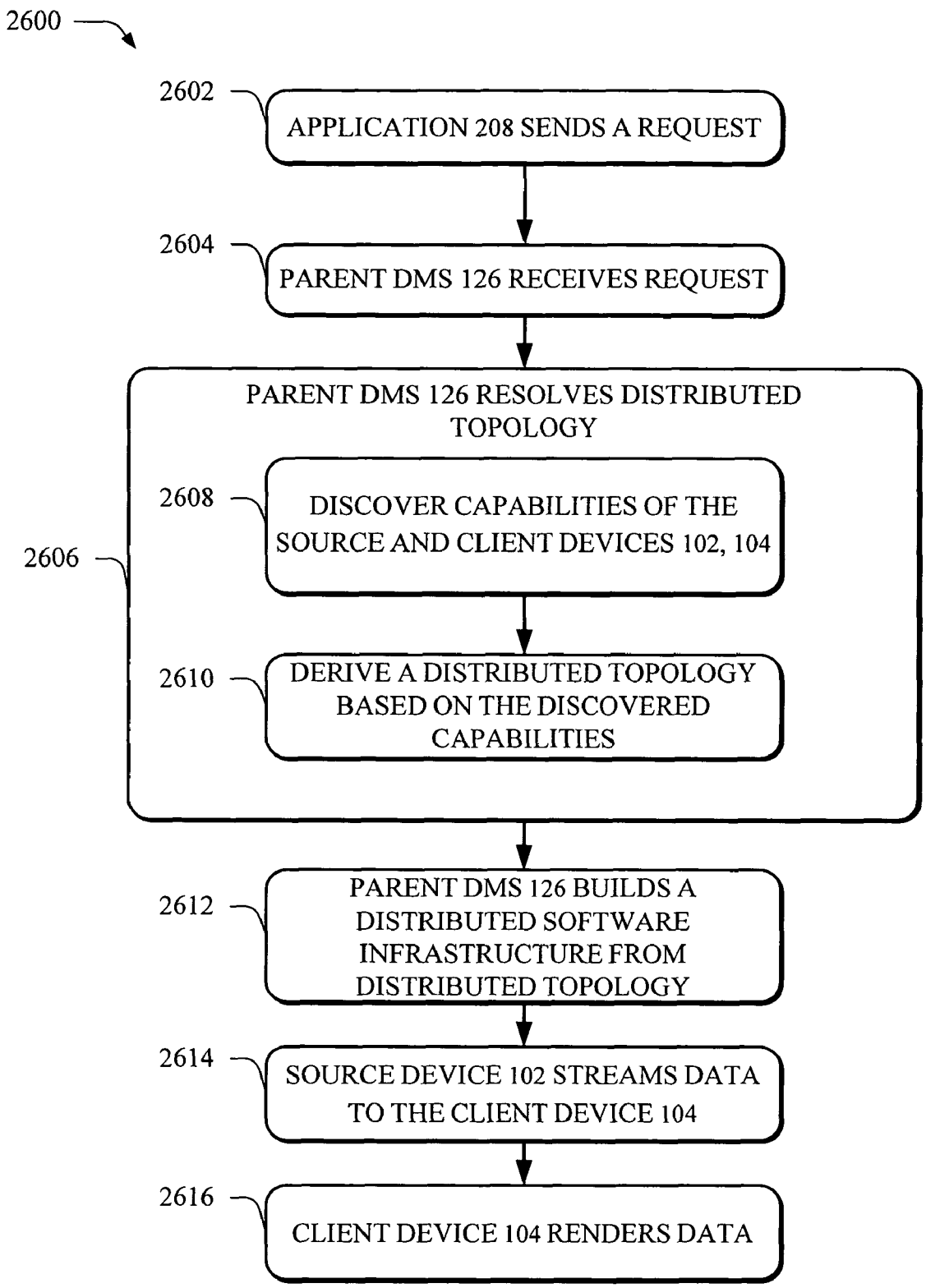
FIG. 26 is a flow diagram depicting an exemplary procedure in which a distributed software infrastructure of software components is built and data is streamed from a source device to a client device for rendering by the client device.

FIG. 26 is a flow chart depicting an exemplary procedure 2600 in which a distributed software infrastructure of software components is built which streams data from the source device 102 to the client device 104. At block 2602, a request is sent by the application 208. The request may include an instruction to communicate streaming data from the source device 102 to the client device 104. The request may be thought of as a partial topology in that it does not include a description of the software components used to build the distributed software infrastructure to stream the data.

At block 2604, the parent DMS 126 receives the request which includes the partial topology of the source device 102 and the client device 104. At block 2606, the parent DMS 126 resolves a distributed topology. The distributed topology is a plan that references software components suitable to stream data from the source device 102 over a network to the client device 104.

At block 2608, the parent DMS 126 first begins to resolve the distributed topology by discovering capabilities to interact with streaming data of both the source and client devices 102, 104. Capabilities may include software components which are used to stream data that is to be rendered and to render a stream of data by the source and client devices 102, 104, respectively. These capabilities may be discovered in a variety of ways. For example, the parent DMS 126 may examine the source and client devices 102, 104 to determine which software components are included that involve streaming data. The parent DMS 126 may also query a look-up table which includes descriptions of the capabilities of the source and client devices 102, 104.

At block 2610, the parent DMS 126 derives a distributed topology that references a plurality of software components which are suitable to fulfill the request. The distributed topology may reference software components which are already included on the source and client devices 102, 104, as well as additional software components which are to be included to stream data from the source device 102 to the client device 104.

At block 2612, the parent DMS 126 builds a distributed software infrastructure from the distributed topology which includes the software components referenced by the distributed topology. For instance, the parent DMS 126 may supply an additional software component to build a distributed software infrastructure based on the resolved distributed topology. Thus, the parent DMS 126 uses the distributed topology as a plan to supply software components which are referenced by the distributed topology. At block 2614, the source device 102 streams data to the client device 104 over the network using the distributed software infrastructure. At block 2616, the client device 104 renders the data.

Exemplary Operating Environment

Figure 27:
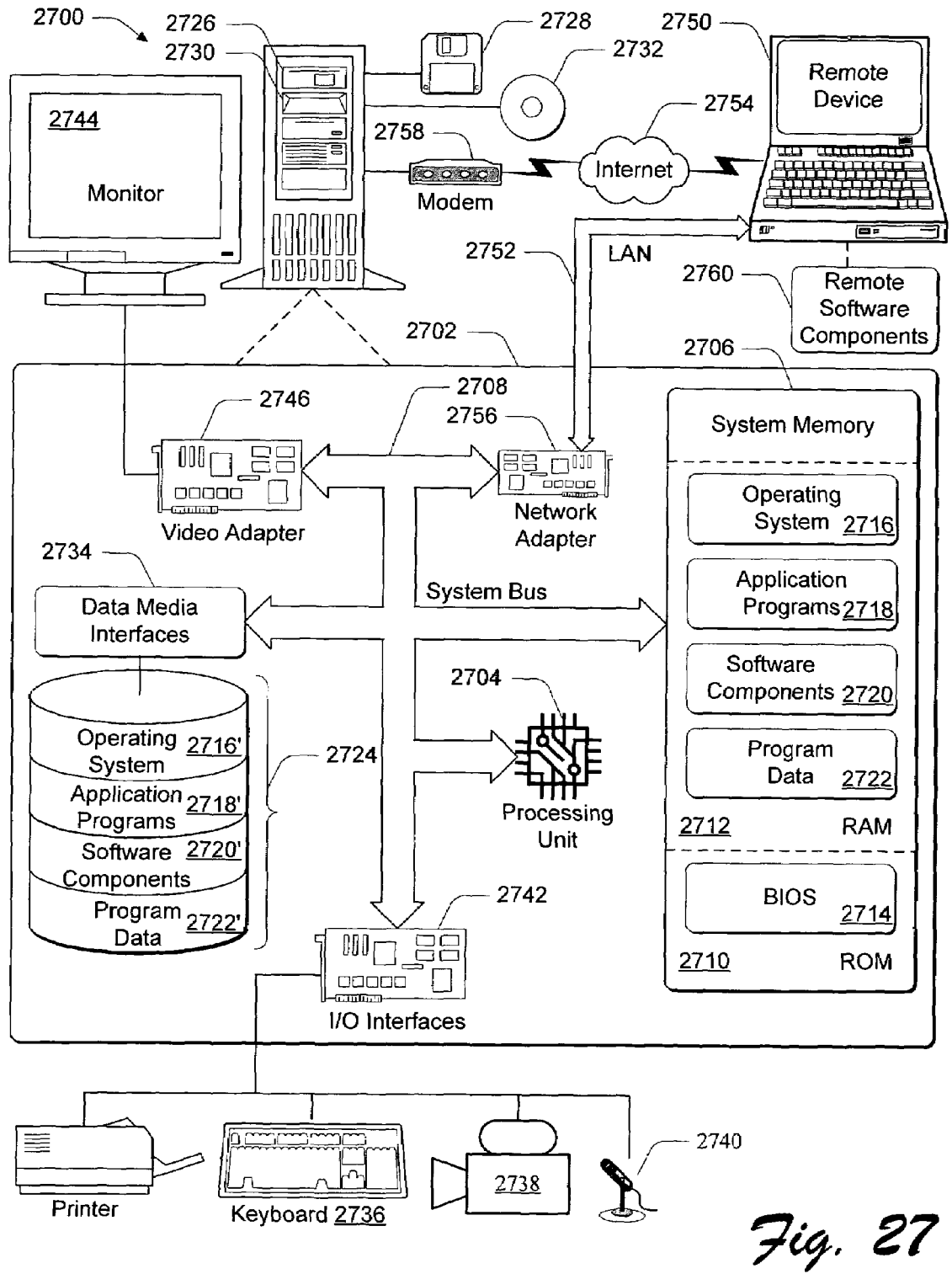
FIG. 27 is an illustration of an exemplary operating environment.

The various components and functionality described herein are implemented with a number of individual computers. FIG. 27 shows components of a typical example of a computer environment 2700, including a computer, referred by to reference numeral 2702. In various implementations, the source device 102, the client device 104, and/or the third party device 2002 may be configured as the computer 2702. The components shown in FIG. 27 are only examples, and are not intended to suggest any limitation as to the scope of the functionality of the invention; the invention is not necessarily dependent on the features shown in FIG. 27.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, network-ready devices, minicomputers, mainframe computers, distributed computing environments that include any of the above systems or devices, and the like.

The functionality of the computers is embodied in many cases by computer-executable instructions, such as software components, that are executed by the computers. Generally, software components include routines, programs, objects, components, data structures, etc. that perform particular tasks or implement particular abstract data types. Tasks might also be performed by remote processing devices that are linked through a communications network. In a distributed computing environment, software components may be located in both local and remote computer storage media.

The instructions and/or software components are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 27, the components of computer 2702 may include, but are not limited to, a processing unit 2704, a system memory 2706, and a system bus 2708 that couples various system components including the system memory to the processing unit 2704. The system bus 2708 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 2702 typically includes a variety of computer-readable media. Computer-readable media can be any available media that can be accessed by computer 2702 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 2702. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 2706 includes computer storage media in the form of volatile and/or nonvolatile memory such as read only memory (ROM) 2710 and random access memory (RAM) 2712. A basic input/output system 2714 (BIOS), containing the basic routines that help to transfer information between elements within computer 2702, such as during start-up, is typically stored in ROM 2710. RAM 2712 typically contains data and/or software components that are immediately accessible to and/or presently being operated on by processing unit 2704. By way of example, and not limitation, FIG. 27 illustrates operating system 2716, application programs 2718, software components 2720, and program data 2722.

The computer 2702 may also include other removable/non-removable, volatile/nonvolatile computer storage media. By way of example only, FIG. 27 illustrates a hard disk drive 2724 that reads from or writes to non-removable, nonvolatile magnetic media, a magnetic disk drive 2726 that reads from or writes to a removable, nonvolatile magnetic disk 2728, and an optical disk drive 2730 that reads from or writes to a removable, nonvolatile optical disk 2732 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2724 is typically connected to the system bus 2708 through a non-removable memory interface such as data media interface 2734, and magnetic disk drive 2726 and optical disk drive 2730 are typically connected to the system bus 2708 by a removable memory interface.

The drives and their associated computer storage media discussed above and illustrated in FIG. 27 provide storage of computer-readable instructions, data structures, software components, and other data for computer 2702. In FIG. 27, for example, hard disk drive 2724 is illustrated as storing operating system 2716', application programs 2718', software components 2720', and program data 2722'. Note that these components can either be the same as or different from operating system 2716, application programs 2718, software components 2720, and program data 2722. Operating system 2716', application programs 2718', software components 2720', and program data 2722' are given different numbers here to illustrate that, at a minimum, they are different copies. A user may enter commands and information into the computer 2702 through input devices such as a keyboard 2736, and pointing device (not shown), commonly referred to as a mouse, trackball, or touch pad. Other input devices may include source peripheral devices (such as a microphone 2738 or camera 2740 which provide streaming data), joystick, game pad, satellite dish, scanner, or the like. These and other input devices are often connected to the processing unit 2702 through an input/output (I/O) interface 2742 that is coupled to the system bus, but may be connected by other interface and bus structures, such as a parallel port, game port, or a universal serial bus (USB). A monitor 2744 or other type of display device is also connected to the system bus 2708 via an interface, such as a video adapter 2746. In addition to the monitor 2744, computers may also include other peripheral rendering devices (e.g., speakers) and one or more printers 2748, which may be connected through the I/O interface 2742.

The computer may operate in a networked environment using logical connections to one or more remote computers, such as a remote device 2750. The remote device 2750 may be a personal computer, a network-ready device, a server, a router, a network PC, a peer device or other common network node, and typically includes many or all of the elements described above relative to computer 2702. The logical connections depicted in FIG. 27 include a local area network (LAN) 2752 and a wide area network (WAN) 2754. Although the WAN 2754 shown in FIG. 27 is the Internet, the WAN 2754 may also include other networks. Such networking environments are commonplace in offices, enterprise-wide computer networks, intranets, and the like.

When used in a LAN networking environment, the computer 2702 is connected to the LAN 2752 through a network interface or adapter 2756. When used in a WAN networking environment, the computer 2702 typically includes a modem 2758 or other means for establishing communications over the Internet 2754. The modem 2758, which may be internal or external, may be connected to the system bus 2708 via the I/O interface 2742, or other appropriate mechanism. In a networked environment, program modules depicted relative to the computer 2702, or portions thereof, may be stored in the remote device 2750. By way of example, and not limitation, FIG. 27 illustrates remote software components 2760 as residing on remote device 2750. It will be appreciated that the network connections shown are exemplary and other means of establishing a communications link between the computers may be used.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method, comprising:
    requesting data to be streamed from a source device to a client device over a network;
    building, by a parent Distributed Media Session ("DMS"), a distributed software infrastructure from an optimized distributed topology, the built distributed software infrastructure configured to stream data to the client device from the source device without rendering the data by the source device, the parent DMS providing a federated mechanism for control;
    resolving, by the parent DMS, a distributed topology from the request, wherein:
    the distributed topology references a plurality of software components that, when executed, fulfill the request;

at least one of the plurality of software components is executable on each of:
the source device; and
the client device,
instantiating, by the parent DMS, one or more child DMS; and
delegating control of one or more of the plurality of software components of the distributed software infrastructure to the one or more child DMS.

2. A method as described in claim 1, wherein the resolving further comprises:
discovering the capabilities of the client device to render a stream of data;
discovering the capabilities of the source device to stream data that is to be rendered, the discovering the capabilities of the client device and the source device by querying a look-up table that specifies a particular capability; and
deriving the distributed topology from both the client device capabilities and the source device capabilities.

3. A method as described in claim 1, wherein the distributed topology is selected from the group consisting of:
a remote sink distributed topology;
a remote source distributed topology; and
a third party distributed topology.

4. A method as described in claim 1, further comprising building a distributed software infrastructure from the distributed topology, wherein the distributed software infrastructure includes the plurality of software components.

5. A method as described in claim 1, wherein:
the request also requests streaming data from an additional source device to the client device; and
the resolving resolves the distributed topology such that the plurality of software components, when executed, fulfills the request to stream data from each of the source device and the additional source device, respectively, to the client device.

6. A method as described in claim 1, wherein:
the request also requests streaming data from the source device to an additional client device; and
the resolving resolves the distributed topology such that the plurality of software components, when executed, fulfills the request to stream data from the source device to each of the client device and the additional client device.

7. A method as described in claim 1, wherein the distributed software infrastructure includes the parent DMS, whereby:
the at least one software component that is executable on the source device is controllable by the parent DMS; and
the at least one software component that is executable on the client device is controllable by the parent DMS.

8. A method as described in claim 1, wherein the resolving is executed without user intervention on a device selected from the group consisting of:
the source device;
the client device; and
a third party device.

9. One or more computer-readable storage media comprising computer-executable instructions that, when executed, perform the method as recited in claim 1.

10. A method, comprising:
receiving a request to stream data from a source device to a client device over a network; and
resolving, by a parent Distributed Media Session ("DMS"), a distributed topology that references software components to fulfill the request, the parent DMS providing a federated mechanism for control, wherein the distributed topology is resolved from:
capabilities of the client device to render a stream of data; and
capabilities of the source device to stream data that is to be rendered;
building, by the parent DMS, a distributed software infrastructure from an optimized distributed topology, the built distributed software infrastructure configured to stream data to the client device from the source device without rendering the data by the source device, and building from the distributed topology a distributed software infrastructure that includes the referenced software components, wherein at least one of the software components is executable on each of:
the source device; and
the client device, and
instantiating, by the parent DMS, one or more child DMS; and
delegating control of the referenced software components included within the distributed software infrastructure to the one or more child DMS.

11. A method as described in claim 10, wherein the distributed topology is selected from the group consisting of:
a remote sink distributed topology;
a remote source distributed topology; and
a third party distributed topology.

12. A method as described in claim 10, wherein the resolving further comprises:
discovering the capabilities of the client device to render a stream of data;
discovering the capabilities of the source device to stream data that is to be rendered, the discovering the capabilities of the client device and the source device by querying a look-up table that specifies a particular capability; and
deriving a distributed topology from the capabilities of the client device and the capabilities of the source device, wherein the distributed topology references the software components.

13. A method as described in claim 10, wherein the distributed topology references the parent DMS such that:
the at least one software component that is executable on the source device is controllable by the parent DMS; and
the at least one software component that is executable on the client device is controllable by the parent DMS.

14. A method as described in claim 10, wherein the receiving and the resolving are executed without user intervention on a device selected from the group consisting of:
the source device;
the client device; and
a third party device.

15. One or more computer-readable media comprising computer-executable instructions that, when executed, perform the method as recited in claim 10.

16. A method, comprising:
discovering the capabilities of a client device to render a stream of data;
discovering the capabilities of a source device to stream data that is to be rendered, the discovering the capabilities of the client device and the source device by querying a look-up table that specifies a particular capability;
building, by a parent Distributed Media Session ("DMS"), a distributed software infrastructure from an optimized distributed topology, the built distributed software infrastructure configured to stream data to the client device from the source device without rendering the data by the source device, the parent DMS providing a federated mechanism for control;

deriving, by the parent DMS, a distributed topology from the capabilities of the client device and the capabilities of the source device, wherein:

the distributed topology references a plurality of software components to fulfill the request; and at feast one of the software components referenced by the distributed topology is executable on each of:
the source device; and
the client device, and instantiating, by the parent DMS, one or more child DMS; and delegating control of one or more of the referenced plurality of software components to the one or more child DMS.

17. A method as described in claim 16, wherein the distributed topology is selected from the group consisting of:
a remote sink distributed topology;
a remote source distributed topology; and
a third party distributed topology.

18. A method as described in claim 16, further comprising building from the distributed topology a distributed software infrastructure that includes the software components.

19. A method as described in claim 16, wherein:
the discovering of the capabilities of the client device further comprises examining the client device to find a software component which renders a stream of data; and
the discovering of the capabilities of the source device further comprises examining the source device to find a software component which streams data.

20. A method as described in claim 16, wherein the look-up table contains:
the capabilities of the client device to render the stream of data; and
the capabilities of the source device to stream data that is to be rendered.

21. A method as described in claim 16, wherein the distributed topology references the parent DMS that provides a federated mechanism for control such that:
the at least one software component that is executable on the source device is controllable by the parent DMS; and
the at least one software component that is executable on the client device is controllable by the parent DMS.

22. A method as described in claim 16, wherein the receiving and the resolving are executed without user intervention on a device selected from the group consisting of:
the source device;
the client device; and
a third party device.

23. One or more computer-readable media comprising computer-executable instructions that, when executed, perform the method as recited in claim 16.

24. A method, comprising:
receiving a request to stream data from a source device to a client device;
discovering the capabilities of the client device to render a stream of data;
discovering the capabilities of the source device to stream data that is to be rendered, the discovering the capabilities of the client device and the source device by querying a look-up table that specifies a particular capability;
deriving, by a parent Distributed Media Session ("DMS"), a distributed topology to fulfill the request from the capabilities of the client device and the capabilities of the source device wherein the distributed topology references a plurality of software components, the parent DMS providing a federated mechanism for control;
building, by the parent DMS, from the distributed topology a distributed software infrastructure, wherein the distributed software infrastructure includes the software components referenced by the distributed topology;
building, by the parent DMS, a distributed software infrastructure from an optimized distributed topology, the built distributed software infrastructure configured to stream data to the client device from the source device to the client device without rendering the data by the source device;
instantiating, by the parent DMS, one or more child DMS;
delegating control of one or more of the plurality of software components referenced by the distributed topology to the one or more child DMS;
streaming the data from the source device to the client device; and
rendering the data by the client device.

25. A parent distributed media session ("DMS"), comprising
a software component residing on a storage medium having instructions that when executed, directs acts comprising:
resolving, by the DMS that provides a federated mechanism for control, a distributed topology that references a plurality of software components that, when executed, fulfill a request to stream data from a source device to a client device; wherein the resolving further comprises optimizing the distributed topology such that the distributed software infrastructure which is built from the distributed topology is configured to stream data from the source device to the client device without rendering the data by the source device before the data is streamed;
building, from the distributed topology, a distributed software infrastructure that includes the software components, wherein at least one of the software components is executable on each of:
the source device; and
the client device,
instantiating, by the parent DMS, one or more child DMS; and
delegating control of one or more of the plurality of software components to the one or more child DMS.

26. The parent DMS as described in claim 25, wherein the resolving further comprises:
discovering the capabilities of the client device to render a stream of data;
discovering the capabilities of the source device to stream data that is to be rendered, the discovering the capabilities of the client device and the source device by querying a look-up table that specifies a particular capability; and
deriving the distributed topology from the capabilities of the client device and the capabilities of the source device.

27. The parent DMS as described in claim 25, wherein the distributed topology is selected from the group consisting of:
a remote sink distributed topology;
a remote source distributed topology; and
a third party distributed topology.

28. The parent DMS as described in claim 25, wherein the building further comprises supplying at least one additional software component which is referenced by the distributed topology.

29. A computer-readable medium comprising computer-executable instructions residing on a storage medium that, when executed, direct a computing device to perform acts comprising:
- resolving, by a parent Distributed Media Session ("DMS") and without user intervention, a distributed topology that references a plurality of software components that, when executed, stream data from a source device to a client device over a network;
- building, by the parent DMS, a distributed software infrastructure from an optimized distributed topology, the built distributed software infrastructure configured to stream data to the client device from the source device to the client device without rendering the data by the source device; wherein at least one of the plurality of software components is executable on each of:
  - the source device; and
  - the client device,
- instantiating, by the parent DMS, one or more child DMS; and
- delegating control of one or more of the plurality of software components to the one or more child DMS.

30. A computer-readable medium as described in claim 29, wherein the resolving further comprises:
- discovering the capabilities of the client device to render a stream of data;
- discovering the capabilities of the source device to stream data that is to be rendered, the discovering the capabilities of the client device and the source device by Querying a look-up table that specifies a particular capability; and
- deriving the distributed topology from the capabilities of the client device and the capabilities of the source device.

31. A computer-readable medium as described in claim 29, wherein the distributed topology is selected from the group consisting of:
- a remote sink distributed topology;
- a remote source distributed topology; and
- a third party distributed topology.

32. A computer-readable medium as described in claim 29, further comprising building a distributed software infrastructure from the distributed topology.

33. A computer-readable storage medium comprising computer-executable instructions that, when executed, direct a computing device to perform acts comprising:
- discovering the capabilities of a client device to render a stream of data;
- discovering the capabilities of a source device to stream data that is to be rendered, the discovering the capabilities of the client device and the source device by querying a look-up table that specifies a particular capability;
- deriving, by a parent Distributed Media Session ("DMS") and without user intervention, a distributed topology from both the capabilities of the client device and the capabilities of the source device, wherein:
  - the distributed topology references a plurality of software components that, when executed, stream data, without rendering the data, from the source device to the client device; and
  - at least one of the plurality of software components referenced by the distributed topology is executable on each of:
    - the source device; and
    - the client device,
- instantiating, by the parent DMS, one or more child DMS; and
- delegating control of one or more of the plurality of software components to the one or more child DMS.

34. A computer-readable medium as described in claim 33, further comprising building from the distributed topology a distributed software infrastructure that includes the plurality of software components.

35. A system, comprising:
- a source device that is operable to stream data to be rendered;
- a client device that is operable to render a stream of data; and
- a parent distributed media session ("DMS") which when executed, causes actions to be performed including:
  - resolving, by the parent DMS, a distributed topology that references a plurality of software components that, when executed, stream data from the source device to the client device over a network;
  - building, by the parent DMS, from the distributed topology a distributed software infrastructure that includes the software components, wherein the building further comprises building the distributed software infrastructure from an optimized distributed topology, the built distributed software infrastructure configured to stream data to the client device from the source device without rendering the data by the source device, wherein at least one of the software components is executable on each of:
    - the source device; and
    - the client device,
  - instantiating one or more child DMS; and
  - delegating control of one or more of the plurality of software components to the one or more child DMS.

36. A system as described in claim 35, wherein the source device is selected from the group consisting of:
- a computing device which is locally connected to a source peripheral device; and
- a network-ready device that is operable to stream data that is to be rendered.

37. A system as described in claim 35, wherein the client device is selected from the group consisting of:
- a computing device which is locally connected to a rendering device; and
- a network-ready device suitable for rendering data.

38. A system as described in claim 35, wherein the resolving further comprises:
- discovering the capabilities of the client device to render a stream of data;
- discovering the capabilities of the source device to stream data that is to be rendered, the discovering the capabilities of the client device and the source device by querying a look-up table that specifies a particular capability; and
- deriving the distributed topology from the capabilities of the client device and the capabilities of the source device.

39. A system as described in claim 35, wherein the distributed topology is selected from the group consisting of:
- a remote sink distributed topology;
- a remote source distributed topology; and
- a third party distributed topology.

40. A system as described in claim 35, wherein the building further comprises supplying at least one software component that is referenced by the distributed topology.

41. A system as described in claim 35, wherein the execution of the parent DMS is performed by one of:
- the source device;
- the client device; and
- a third party device.

42. A system, comprising:

a source device which includes a software component that, when executed by the source device, streams data that is to be rendered;

a client device which includes a software component that, when executed by the client device, renders a stream of data; and a parent distributed media session ("DMS"), which when executed by either the source device or the client device, provides a federated mechanism for control of:

the software component that, when executed by the source device, streams data without rendering the data that is to be rendered; and the software component that, when executed by the client device, renders a stream of data, the parent DMS instantiating one or more child DMS and delegating control of the software component to the one or more child DMS.

43. A system as described in claim 42, wherein the source device is selected from the group consisting of:

a computing device which is locally connected to a source peripheral device; and a network-ready device that is operable to stream data that is to be rendered.

44. A system as described in claim 42, wherein the client device is selected from the group consisting of:

a computing device which is locally connected to a rendering device; and a network-ready device suitable for rendering data.

* * * * *